US010621613B2

(12) United States Patent
Shiravi Khozani et al.

(10) Patent No.: US 10,621,613 B2
(45) Date of Patent: Apr. 14, 2020

(54) SYSTEMS AND METHODS FOR MONITORING MALICIOUS SOFTWARE ENGAGING IN ONLINE ADVERTISING FRAUD OR OTHER FORM OF DECEIT

(71) Applicant: THE NIELSEN COMPANY (US), LLC, New York, NY (US)

(72) Inventors: Hadi Shiravi Khozani, Fredericton (CA); Ehsan Mokhtari, Fredericton (CA); Sergei Frankoff, Fredericton (CA); Mohammad Ali Shiravi Khozani, Fredericton (CA)

(73) Assignee: The Nielsen Company (US), LLC, New York, NY (US)

( * ) Notice: Subject to any disclaimer, the term of this patent is extended or adjusted under 35 U.S.C. 154(b) by 841 days.

(21) Appl. No.: 15/147,503

(22) Filed: May 5, 2016

(65) Prior Publication Data

US 2016/0328742 A1 Nov. 10, 2016

Related U.S. Application Data

(60) Provisional application No. 62/157,195, filed on May 5, 2015.

(51) Int. Cl.
*G06Q 30/00* (2012.01)
*G06Q 30/02* (2012.01)
*G06F 21/53* (2013.01)
*H04L 29/06* (2006.01)

(52) U.S. Cl.
CPC ......... *G06Q 30/0248* (2013.01); *G06F 21/53* (2013.01); *H04L 63/1425* (2013.01); *H04L 2463/144* (2013.01)

(58) Field of Classification Search
None
See application file for complete search history.

(56) References Cited

U.S. PATENT DOCUMENTS

| | | | |
|---|---|---|---|
| 7,509,679 B2 | 3/2009 | Alagna et al. | |
| 7,533,271 B2 * | 5/2009 | Laksono | H04L 43/00 380/211 |
| 7,979,907 B2 | 7/2011 | Schultz et al. | |
| 8,990,379 B2 | 3/2015 | Pitkow et al. | |
| 2004/0162887 A1 * | 8/2004 | Dillon | G05B 19/4185 709/217 |
| 2005/0169212 A1 * | 8/2005 | Doi | G06F 3/0346 370/328 |
| 2007/0150957 A1 * | 6/2007 | Hartrell | G06F 21/552 726/24 |
| 2007/0261112 A1 * | 11/2007 | Todd | G06F 21/577 726/11 |
| 2008/0182667 A1 * | 7/2008 | Davis | G07F 17/32 463/43 |
| 2009/0077095 A1 * | 3/2009 | Imai | G06F 16/907 |
| 2009/0125719 A1 | 5/2009 | Cochran et al. | |

(Continued)

*Primary Examiner* — Matthew T Sittner
(74) *Attorney, Agent, or Firm* — Hanley, Flight & Zimmerman, LLC

(57) ABSTRACT

Systems, methods, and devices for advertising fraud malicious software botnet detection. Systems, methods, and devices for advertising fraud infrastructure infiltration. Systems, methods, and devices for identifying non-organic traffic entities. Systems, methods, and devices for local instrumentation of advertising fraud malicious software.

20 Claims, 13 Drawing Sheets

(56) References Cited

U.S. PATENT DOCUMENTS

| | | | |
|---|---|---|---|
| 2009/0144561 A1 | 6/2009 | Davidson et al. | |
| 2009/0158430 A1* | 6/2009 | Borders | G06F 21/552 |
| | | | 726/23 |
| 2010/0082400 A1 | 4/2010 | Bagherjeiran et al. | |
| 2011/0047192 A1* | 2/2011 | Utsunomiya | G06F 16/10 |
| | | | 707/809 |
| 2011/0060788 A1* | 3/2011 | Haybi | G06F 16/958 |
| | | | 709/203 |
| 2011/0202755 A1* | 8/2011 | Orsini | H04L 63/029 |
| | | | 713/151 |
| 2011/0219205 A1* | 9/2011 | Wright | G06F 15/173 |
| | | | 711/206 |
| 2012/0017275 A1* | 1/2012 | Harmonen | G06F 21/56 |
| | | | 726/24 |
| 2012/0151033 A1* | 6/2012 | Baliga | H04L 63/1425 |
| | | | 709/224 |
| 2013/0219479 A1* | 8/2013 | DeSoto | H04W 12/06 |
| | | | 726/6 |
| 2014/0259147 A1* | 9/2014 | L'Heureux | H04L 63/02 |
| | | | 726/14 |
| 2014/0278864 A1* | 9/2014 | Stanislaw | G06Q 30/0246 |
| | | | 705/14.16 |
| 2015/0234645 A1* | 8/2015 | Ramachandran | G06F 8/61 |
| | | | 717/178 |
| 2015/0332258 A1* | 11/2015 | Kurabi | G06Q 20/401 |
| | | | 705/71 |
| 2016/0127398 A1 | 5/2016 | Cohen | |
| 2016/0205073 A1* | 7/2016 | Smith | G06F 21/00 |
| | | | 726/12 |
| 2016/0328742 A1* | 11/2016 | Shiravi Khozani | |
| | | | G06Q 30/0248 |

* cited by examiner

FIG. 10

SYSTEMS AND METHODS FOR MONITORING MALICIOUS SOFTWARE ENGAGING IN ONLINE ADVERTISING FRAUD OR OTHER FORM OF DECEIT

CROSS-REFERENCE TO RELATED APPLICATIONS

This application claims the benefit of U.S. Patent Application No. 62/157,195, filed May 5, 2015, the contents of which are hereby incorporated by reference in their entirety.

FIELD

The present application generally relates to the field of online advertising and malicious software.

INTRODUCTION

Malicious software compromises computers to imitate legitimate users for the purpose of committing online advertising fraud or other forms of deceit. There exists a need to identify, provide instrumentation for, monitor, profile and otherwise interact with malicious software and compromised computers.

SUMMARY

In accordance with one aspect, a process for mass automated binary code categorization to identify malicious software engaging in fraudulent or deceitful online advertising behaviour is provided. The process may involve collecting and observing data defining behaviour of binary code using sensors from multiple sandboxes in parallel, where a sandbox provides a code execution environment. The process may involve categorizing the binary code based on its behaviour using behaviour signatures composed of selectors and filters, the behaviour signatures defining a category based on actions on a computing environment, the filter operating such that a positive match will remove the binary code from the signature category, the selector operating such that a positive match will add the binary code to the signature category. The process may involve identifying binary code categorized with behaviour specific to malicious software engaging online advertising targeted behaviour, and triggering operations based on the identified binary code.

In accordance with another aspect, the binary code may represent at least one of bit strings, text and computer processor instructions.

In accordance with another aspect, the binary code may define at least part of an executable data file.

In accordance with another aspect, the targeted behaviour specific to malware may include at least one of fraud, deception, misrepresentation and concealment related to advertisers, publishers, advertising networks or users.

In accordance with another aspect, the targeted behaviour specific to malware may include at least behaviours of fraud, deception, misrepresentation and concealment related to the context in which an advertising event has occurred.

In accordance with another aspect, the multiple sandboxes may include two or more different operating environments.

In accordance with another aspect, the multiple sandboxes may include at least a virtualized operating system.

In accordance with another aspect, the multiple sandboxes may be controlled by a management controller configured to operate at least two of the multiple sandboxes in parallel.

In accordance with another aspect, the number of multiple sandboxes in operation may be controlled at least in part on the availability of system resources.

In accordance with another aspect, the sensors include at least one of keystroke loggers, instruction loggers, interaction loggers, interface loggers, access loggers, file system loggers, web query loggers, network traffic loggers, registry loggers, and code execution loggers.

In accordance with another aspect, the sensors may be configured to sense information including at least programmatic calls to one or more operating system kernel interfaces, names of files created, deleted, or accessed, registry keys created, deleted, or accessed, mutex creation, network traffic information, domain name service requests, web query events, and HTTP traffic.

In accordance with another aspect, different permutation of sequences for applying the selectors and filters to the binary code result in different behaviour signatures.

In accordance with another aspect, the behaviour of binary code includes at least one of writing strings to memory, generating network traffic, conducting API calls related to network protocols, conducting API calls related to cryptography.

In accordance with another aspect, the behaviour signatures include at least one of combinations of actions including at least one of writing strings to memory, altering or creating of registry keys and/or configuration files for a web browser, invoking an API call to suppress audio or visual messaging, invoking an API call associated with the creation and control of an instance of a web browser, invoking API calls that hide windows when they are created, and invoking API calls that can be used to create multiple desktops or mobile screens.

In accordance with another aspect, the behaviour signatures may have behaviour signatures related to malware including at least one of writing strings to memory, altering or creating of registry keys or configuration files for web browsers other than Internet Explorer, and invoking API calls associated with the installation of a web browser plugin or extension.

In accordance with another aspect, the process may further involve polling binary sample feeds to download new binary code for execution by at least one sandbox, and observation by sensors.

In accordance with another aspect, the binary sample feeds include malware submissions to third party servers.

In accordance with another aspect, the binary sample feeds may be automatically retrieved.

In accordance with another aspect, the binary sample feeds are configured for receiving submitted binary samples.

In accordance with another aspect, the process may further involve conducting a preliminary determination on a binary header of the binary sample to verify that the binary sample is a valid executable.

In accordance with another aspect, the process may further involve upon determination, if the binary header is not valid, discarding the binary sample.

In accordance with another aspect, the process may further involve upon determination, if the binary header is valid, generating MD5 and SHA256 hashes and adding the binary sample and the hashes to a malware database as a binary BLOB.

In accordance with another aspect, the process may further involve associating data with each binary sample, including at least one of an MD5 hash, a SHA256 hash, a binary file, status information ("new", "enriched", "failed", "complete"), a list of defined behaviours and attributes, a Boolean flag indicating advertising fraud, and a family indicating a name of known groups of similar advertising fraud malware.

In accordance with another aspect, the process may further involve formatting the behaviour of binary code collected by the sensors into text key and value pairs.

In accordance with another aspect, the process may further involve classifying the binary code as advertising fraud malware or not advertising fraud malware.

In accordance with another aspect, the process may further involve tuning the selectors and the filters based on review input data.

In accordance with another aspect, the process may further involve tuning the selectors and the filters based on information provided by an automated review of the categorized binary code.

In accordance with another aspect, the automated review may include a feedback loop configured to tune the selectors and the filters over a period of time.

In accordance with another aspect, the process further may involve recording behaviours identified as being associated with malware as additional signatures.

In accordance with another aspect, the behaviour signatures may be classified as low level signatures or high level signatures based on the level of abstraction from the machine-code operation of the one or more computing devices.

In accordance with another aspect, the behaviour signatures may be identified based in part on common behaviours among the one or more behaviours.

In accordance with another aspect, a minimum number of behaviour signatures may be used, the minimum number forming an effective baseline for identifying malware.

In accordance with another aspect, behaviour signatures may be identified using regular expression matching techniques.

In accordance with another aspect, embodiments described herein may provide a method for monitoring a network of compromised computing devices executing malicious software including instruction sets for accessing advertising weblinks. The method may involve identifying one or more communication and encryption processes used by the compromised computing devices to communicate with at least one control server providing access to advertising weblinks. The method may involve communicating, by a Milker bot interface to the control server, one or more requests for advertising weblinks, using the identified one or more communication and encryption processes to mimic one or more requests from a compromised computing device, the Milker bot interface running multiple Milker bots in parallel; receiving the one or more advertising weblinks from the control server. The method may involve processing the one or more advertising weblinks to identify and monitor the control server(s).

In accordance with another aspect, the identifying of the one or more communication and encryption processes used by the compromised computing devices to communicate with the control server may involve: operating a compromised computing device in conjunction with a debugger; using the debugger, recording one or more instructions executed by the compromised computing device; and analyzing the one or more recorded instructions to identify one or more communication and encryption processes used by the compromised computing devices to communicate with the control server.

In accordance with another aspect, identifying of the one or more communication and encryption processes used by the compromised computing devices to communicate with the control server may involve: executing, in a controlled computing environment having one or more sensors, binary code used in part by the compromised computing devices to communicate with the control server; sensing, by the one or more sensors, information relating to the execution of code; analyzing the sensed information to identify one or more communication and encryption algorithms used by the compromised computing devices to communicate with the control server.

In accordance with another aspect, analyzing the one or more advertising weblinks to monitor the control server includes identifying the control server.

In accordance with another aspect, identifying the control server includes at least one of determining an internet protocol address of the control server, identifying a MAC address of the control server, and identifying a physical location of the control server.

In accordance with another aspect, a method is executed in relation to one or more networks to monitor one or more control servers, each of the one or more networks having one or more characteristics. The method may involve generating one or more browsing objects corresponding to each of the one or more received advertising weblinks, the one or more browsing objects each including attributes related to characteristics of the one or more received advertising weblinks. The method may involve using the one or more browsing objects, identifying one or more characteristics of the one or more networks. The method may involve using a distributed dispatcher component to query for browsing objects and schedule workers to trigger actions, a worker being a stateless object initiated with a browsing object as an input parameter by the dispatcher and triggering an action based on the input parameter.

In accordance with another aspect, the one or more browsing objects includes at least one of the advertising weblink, a timestamp, a header, and referral information.

In accordance with another aspect, identifying the one or more characteristics of the one or more networks includes identifying one or more computing devices associated with the one or more networks.

In accordance with another aspect, the identified one or more computing devices associated with the one or more networks includes at least one of traffic routers, exchanges and personal computers.

In accordance with another aspect, the method further involves based on the identified one or more computing devices associated with the one or more networks, flagging one or more packets of information originating from the one or more computing devices associated with the one or more networks as non-organic traffic.

In accordance with another aspect, identifying the one or more characteristics of the one or more networks includes identifying one or more durations of operation of the one or more networks.

In accordance with another aspect, identifying the one or more characteristics of the one or more networks includes identifying one or more computing devices associated with the one or more networks and identifying one or more durations of operation of the one or more networks.

In accordance with another aspect, the method further involves identifying one or more durations of time where a publisher, an advertising network or exchange has engaged in sourcing routing or consuming non-organic traffic by analyzing the one or more characteristics of the one or more networks.

In accordance with another aspect, there is provided a method for creating an electronic profile of malicious software residing on a compromised computing device, the malicious software including instruction sets for accessing advertising weblinks. The method may involve managing an electronic profile identifying one or more communication and encryption processes used by the compromised computing devices to communicate with a control server, the control server providing access to advertising weblinks; directing one or more of the compromised computing devices to communicate with a computing device through re-routing of packets used for communication between the one or more compromised computing devices and the control server, the computing device configured to mimic communications between the compromised computing devices and the control server using the identified one or more communication and encryption processes; recording information from one or more packets transmitted from the one or more computing devices; and analyzing the recorded information to update the electronic profile of the malicious software residing on the compromised computing device.

In accordance with another aspect, the identifying of the one or more communication and encryption algorithms used by the compromised computing devices to communicate with the control server involves: operating a compromised computing device in conjunction with a debugger; using the debugger, recording one or more instructions executed by the compromised computing device; and analyzing the one or more recorded instructions to identify one or more communication and encryption algorithms used by the compromised computing devices to communicate with the control server.

In accordance with another aspect, the identifying of the one or more communication and encryption algorithms used by the compromised computing devices to communicate with the control server involves: executing, in a controlled computing environment having one or more sensors, binary code used in part by the compromised computing devices to communicate with the control server; sensing, by the one or more sensors, information relating to the execution of code; and analyzing the sensed information to identify one or more communication and encryption algorithms used by the compromised computing devices to communicate with the control server.

In accordance with another aspect, there is provided a process for automated categorization of binary code for identifying malicious software engaging in online advertising fraud, the process comprising: collecting and observing data defining behaviour of the binary code using sensors from a plurality of sandboxes, each of the plurality of sandboxes providing a code execution environment; categorizing the binary code using behaviour signatures comprising selectors and filters, the behaviour signatures defining a signature category based on actions the binary code causes a computing environment to perform, wherein a positive match with the filter removes the binary code from the signature category, and wherein a positive match with the selector adds the binary code to the signature category; and identifying binary code as malicious software engaging in online advertising targeted behaviour based on the signature categories associated with the binary code, and triggering operations based on the identified binary code.

In accordance with another aspect, there is provided a method for monitoring a network of compromised computing devices executing malicious software including instruction sets for accessing advertising weblinks, the method comprising:identifying one or more communication and encryption processes used by the compromised computing devices to communicate with at least one control server providing access to advertising weblinks; communicating, by a plurality of milker bots running in parallel, one or more requests for advertising weblinks to the at least one control sever, wherein the communicating comprises using the one or more identified communication and encryption processes to mimic at least one of the compromised computing devices; receiving the one or more requested advertising weblinks from the at least one control server, wherein the advertising weblinks comprise metadata identifying the at least one control server; and processing the one or more advertising weblinks to identify and monitor the at least one control server.

In accordance with another aspect, there is provided a method for creating an electronic profile of malicious software residing on a compromised computing device, the malicious software including instruction sets for accessing advertising weblinks, the method comprising: identifying one or more communication and encryption processes used by the compromised computing device to communicate with a control server, the control server providing access to advertising weblinks; directing the compromised computing device to communicate with an uncompromised computing device through re-routing of packets used for communication between the compromised computing device and the control server, wherein the uncompromised computing device is configured to mimic communications between the compromised computing device and the control server using the identified one or more communication and encryption processes; recording information from one or more packets transmitted from the uncompromised computing device; updating the electronic profile of the malicious software based on the recorded information.

Many further features and combinations thereof concerning embodiments described herein will appear to those skilled in the art following a reading of the instant disclosure.

DESCRIPTION OF THE FIGURES

In the figures, example embodiments are illustrated. It is to be understood that the description and figures are only for the purpose of illustrating some embodiments of the invention and to be used as an aid to understand various concepts disclosed herein.

FIG. 10 is a screenshot of a malware profile, according to some embodiments.

DETAILED DESCRIPTION

Figure 1:
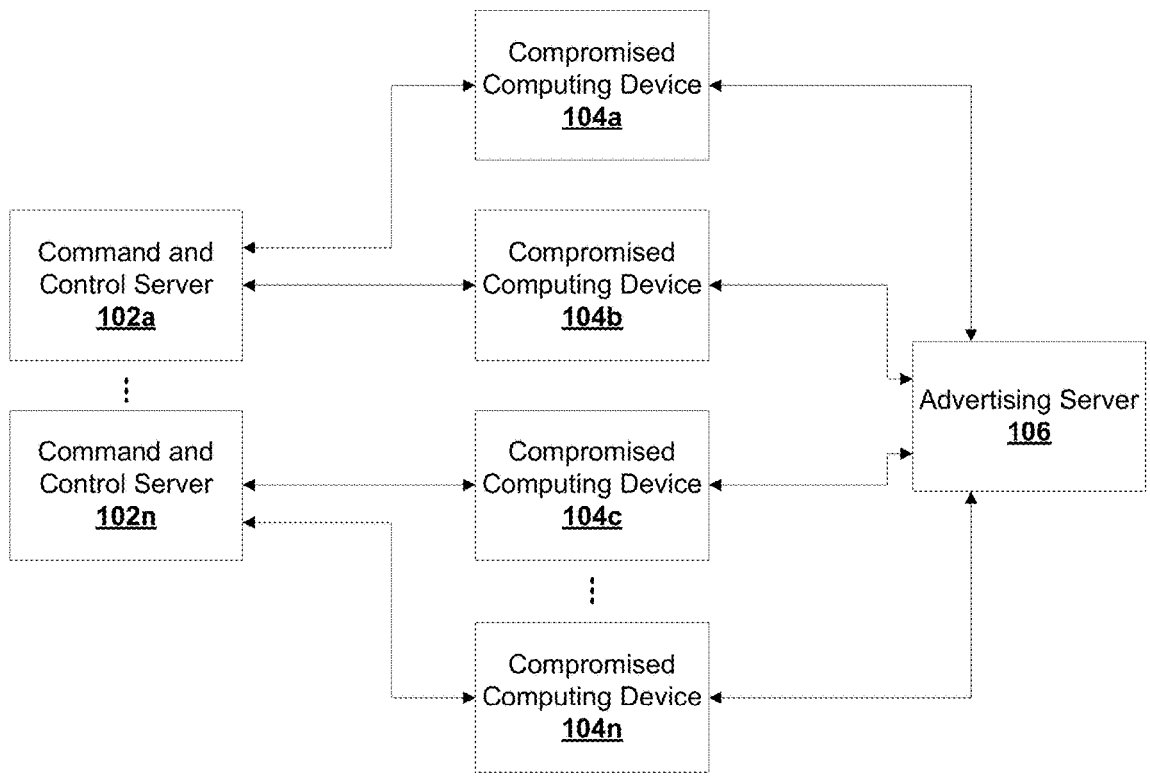
FIG. 1 illustrates an example system connecting command and control servers to various compromised computing devices executing malicious software for defrauding online advertising, which in turn access an advertising server to commit online advertising fraud, according to some embodiments.

The embodiments described herein relate to identifying malicious software used to defraud online advertising and also relate to implementing various actions related to the malicious software used to defraud online advertising.

In the advertising ecosystem, advertising service providers such as, for example, agencies, DSPs, or exchanges, may identify or flag publishers suspected of inflating the number of page views and consequently their advertising impression count by means of purchasing non-organic traffic. The source of the non-organic traffic may be a person, an automated script, computer program, or the like, emulating an organic user of a web browser.

There exists a need within the advertising technology industry to combat online advertising fraud. Although online advertising fraud has increased in sophistication, the techniques and methods used for its detection and mitigation may have not equally advanced.

This may be due to the fact that the advertising technology industry has approached the problem of advertising fraud from a statistical or data analytical perspective, where indicators of human versus bot behaviour are assumed to have been developed. The problem further lies in the fact that such indicators have been developed on assumptions that may no longer be valid and do not reflect those of modern fraud schemes.

Some techniques for detecting fraudulent entities have been focused on user behaviour detection where the interaction level of the user with a website or an advertising banner is measured and further analyzed. Other techniques measure the likelihood of the user's web browser to be of an organic user. Such techniques may be inadequate as entities have created more advanced user emulation code to portray that of an organic user and its web browser.

Some techniques may be based on the assumption that the operators of non-organic traffic, including those generated by botnets, due to the limited number of bots may be required to visit websites with high regularity for their schemes to work. The assumption of limited number of bots may not be valid as botnets can range in between a few thousand nodes to larger networks of a few million nodes. Botnet operators not only generate traffic for their own web pages, they also generate and sell traffic to middle layer traffic services which in turn, sell the traffic to potential publishers looking to increase the number of daily advertising impressions on their websites.

Other assumptions for certain techniques may include the ability of non-organic generating sources to visit the same site in rapid-fire succession, with a few seconds between events. Such assumptions may not be valid as bot operators have adapted to utilize their resources and subsequently program their bots to stay longer on web pages, to fully render video and flash ads, while interacting more with the web page. A grace period parameter may, for example, be issued to the bot to circumvent such detection mechanisms.

Due to the nature of these techniques and the assumptions associated therewith, the results of their analysis may be non-deterministic, probabilistic, prone to both false positives and/or false negatives, and unreliable.

Therefore, it may be beneficial to deterministically detect entities engaged in sourcing non-organic traffic by means of infiltrating the traffic dispatching infrastructure of distributed networks of compromised machines, or at least alternatives.

FIG. 1 illustrates an example system connecting command and control servers 102a . . . n to various compromised computing devices 104a . . . n executing malicious software for online advertising, which in turn access an advertising server 106 to commit online advertising fraud, according to some embodiments.

Generally, the embodiments will be described herein with reference to following steps as an illustrative example:

Step 1: Advertising fraud malicious software botnet detection;
Step 2: Advertising fraud infrastructure infiltration;
Step 3: Identifying non-organic traffic entities; and
Step 4: Local instrumentation of advertising fraud malicious software.

Different sequences and combinations of the steps may be used for other embodiments and the examples described herein are for the purposes of illustration only and are not intended to limit the scope of the invention.

Figure 2:
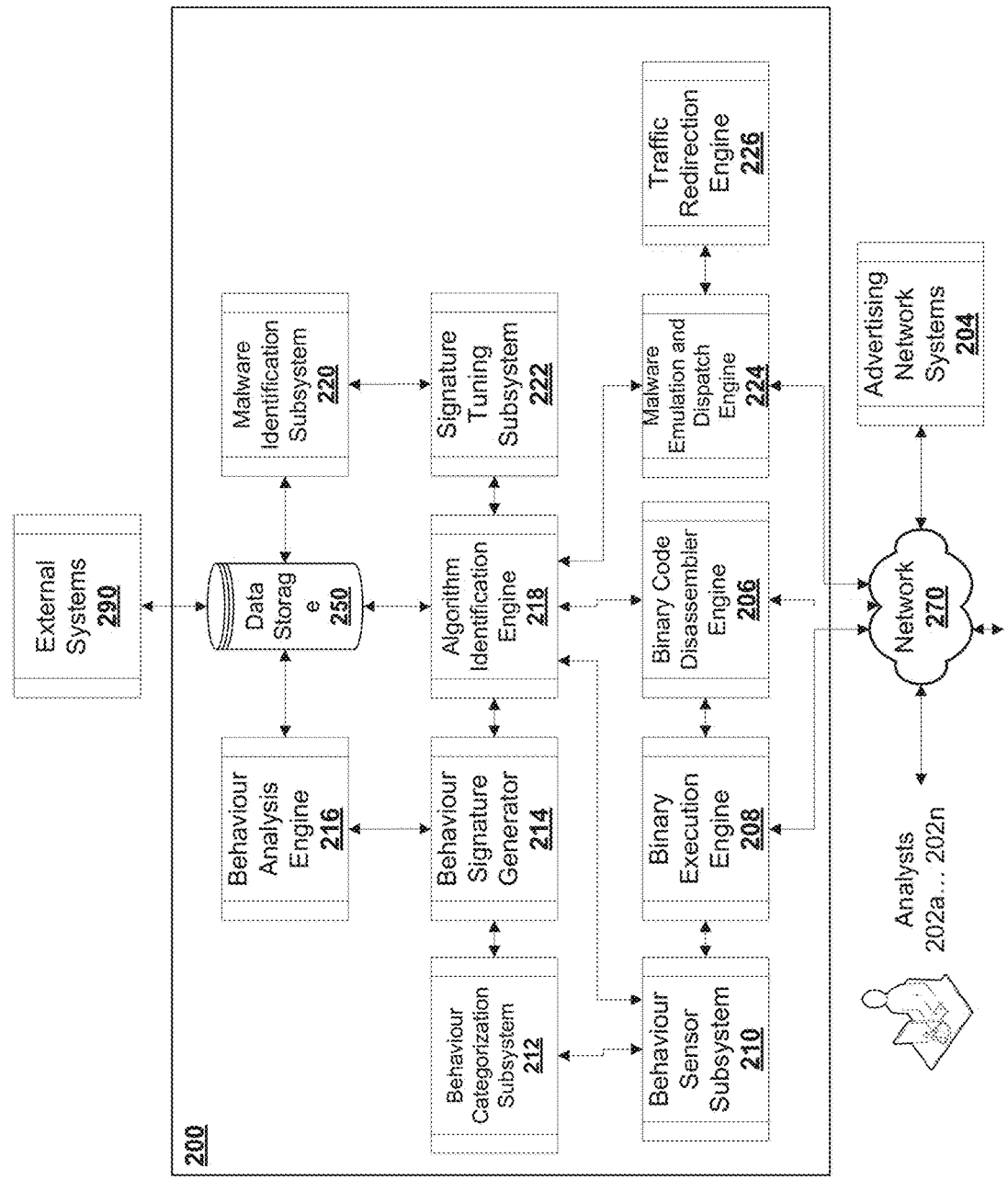
FIG. 2 is a block schematic diagram illustrating various components of a system, according to some embodiments.

FIG. 2 is a block schematic diagram illustrating various components of a system, according to some embodiments.

The system 200 comprises one or more modules, including a binary code disassembler engine 206, a binary execution engine 208, a behaviour sensor subsystem 210, a behaviour categorization subsystem 212, a behaviour signature generator 214, an algorithm identification engine 218, a malware identification subsystem 220, a signature tuning subsystem 222, a malware emulation and dispatch engine 224, a traffic redirection engine 226, and data storage 250, among others.

There may be other, different, and/or alternate modules, and the modules described above are provided as examples. The system 200 may be configured to communicate through network 270, which may include various networks, such as point-to-point networks, intranets, the Internet, etc.

The data storage 250 may be implemented using various technologies, such as non-relational databases such as NoSQL, relational databases, spreadsheets, flat files, etc.

The system may be configured to communicate with various advertising network systems 204 and/or other external systems 290 and analysts 202a to 202n.

The external systems 290 may include, for example, external malware databases storing various behaviours, signatures, etc. that may be indicative of malware.

The binary code disassembler engine 206 may be configured for analysis of binary code that a binary may be comprised of. The binary code, may, in some embodiments, be assembly code, machine code, higher level programming code, Javascript, etc.

The binary execution engine 208 may be configured for the execution of all or a portion of a binary, including the binary code with the binary. The binary execution engine 208 may execute the binary in conjunction with one or more sensors provided by a behaviour sensor subsystem 210, which records various behaviours undertaken by the execution of the binary, such as writing to memory, writing to registries, sending HTTP requests, etc. These behaviours are then categorized as described in various embodiments below by the behaviour categorization subsystem 212. The categorized behaviours may be utilized by the behaviour signature generator 214 to develop, generate, maintain and/or refine various signatures that may be developed in relation to sensed behaviours. The behaviour analysis engine 216 may be used, analyzing various behaviours to assist the behaviour signature generator 214 in determining how to aggregate and to interpret sensed behaviours such that signatures may be generated.

The algorithm identification engine 218 may be configured to receive analyzed binary code information from the binary code disassembler engine 206 and/or various behaviour signatures generated by the behaviour signature generator 214. The algorithm identification engine 218 may, for example, utilize various rules to identify various algorithms used by malware (e.g., bots and/or command and control servers) to communicate, encrypt communications and/or provide instructions that may be used in the operation of an advertising malware botnet.

The malware identification subsystem 220 may be used for the identification of malware based on various inputs, such as malware signatures, externally provided malware definition information, etc. Other information related to malware may also be identified, such as various computing and/or networking devices related to the propagation of malware, the identify and/or location (e.g., IP address) of command and control servers, etc. The malware identification subsystem 220 may provide information that, for example, may be used for the tuning of signatures based on identified positives, negatives, false positives and/or false negatives. The signature tuning subsystem 222 may be used, for example for the tuning and/or refinement of various behaviour signatures identified and/or generated by the behaviour signature generator 214.

A malware emulation and dispatch engine 224 may be configured to utilize and/or implement various algorithms identified by the algorithm identification engine 218 to emulate various aspects of malware, such as a fake command and control server (e.g., fake C2 server), a fake bot (e.g., a Milker), etc. The dispatch engine may be utilized to manage the provisioning of various processes configured to retrieve information through malware emulation, such as Milkers in a parallel configuration.

A traffic redirection engine 226 may be configured to reroute, falsify, spoof and/or otherwise cause traffic to be routed based on various rules. For example, the traffic redirection engine 226 may spoof a false DNS so that a compromised bot will communicate with a false command and control server.

Advertising Fraud Malicious Software Botnet Detection

In an aspect, embodiments described herein relate to a system and process for automated or semi-automated binary code categorization for various purposes, such as identifying malware engaging in online advertising fraud using behaviour signatures with selectors and filters.

The binary code categorization process may rely on a set of processes that may be utilized individually and/or in combination to automatically or semi-automatically collect and analyze binary code, applying various selectors and filters to categorize the binary based at least on one or more characteristics of its behaviour.

In some embodiments, the selectors and/or filters are user-configurable.

By identifying behaviour that is associated with malware related to advertising fraud, the system may be configured to apply various selectors and filters to automatically identify the malware.

Figure 3:
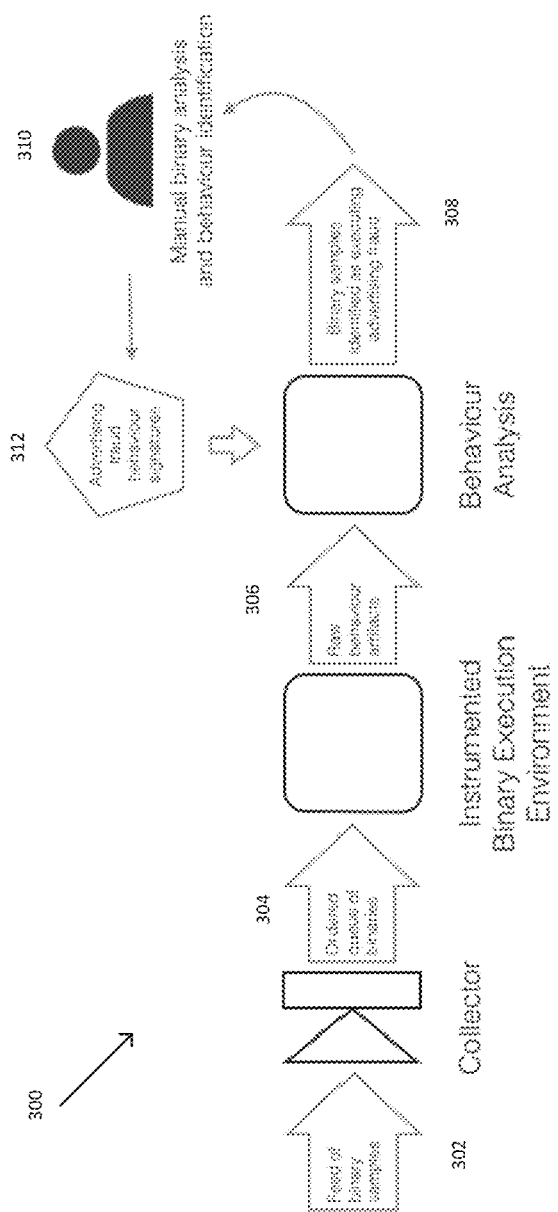
FIG. 3 is a flow chart providing an overview of the process for advertising fraud malicious software botnet detection, according to some embodiments.

FIG. 3 is a flow chart providing an overview of an example process 300 for advertising fraud malicious software botnet detection, according to some embodiments. The process 300 may begin with a feed of binary samples at 302 to a Collector, which provides an ordered queue of binaries to an instrumented binary execution environment at 304. At 306, raw behaviour artifacts are extracted from the execution of the binary and used for analyzing the behaviour of the binary. At 308, the behaviour is compared against advertising fraud behaviour signatures to identify binary samples that are executing advertising fraud. In some embodiments, manual binary analysis and behaviour identification may be performed at step 310. Identified advertising fraud behaviour signatures can then be fed back at 312 to refine the behaviour analysis signatures.

In some embodiments, a process is provided for mass automated binary code categorization for identifying malicious software engaging online advertising fraud.

The process involves different operations, such as collecting and observing data defining behaviour of binary code using sensors from multiple sandboxes in parallel. A sandbox provides a code execution environment.

In some embodiments, the process categorizes the binary code based on its behaviour using behaviour signatures composed of selectors and filters. The behaviour signatures define a category based on actions on a computing environment. The filter operates such that a positive match will remove the binary code from the signature category. The selector operates such that a positive match will add the binary code to the signature category.

In some embodiments, the process identifies binary code categorized with behaviour specific to malicious software engaging online advertising targeted behaviour, and triggers operations based on the identified binary code.

The principle behind the analysis is that code may be developed for a purpose, whether intended (by the developer) or perceived (by the analyst).

In order for the code to achieve this purpose, the code must execute a series of actions. These actions and their effect on the environment that is executing the code are referred to as the behaviour of the code. Code that is developed for the purpose of committing advertising fraud may exhibit certain identifiable behaviours during execution.

In some embodiments, a system is provided to identify these behaviours through automatic, semi-automatic and/or manual analysis and/or reverse engineering of various binaries and/or programs used as malware to commit advertising fraud. For example, code analysis techniques may be used, or the programs themselves may be run under the ambit of a controlled and/or monitored environment.

In some embodiments, one or more identified behaviours are correlated to develop one or more electronic behaviour signature profiles that can be used to identify malware developed for the purpose of committing advertising fraud. The relationship between the identified behaviours and the behaviour signature profiles may be a one to one relationship, a many to one, a one to many, or a n-to-n relationship. Historical behaviours may also be utilized in the development of behaviour signatures.

In some embodiments, during the operation of a categorization process, the system is be configured to continue to identify new behaviours as binaries and/or code identified by the process are further analyzed.

Some conventional binary classification systems may focus on identifying specific behaviour in binaries, or on identifying patterns in the binary code that are used to group or classify the binary.

A deficiency that may arise with these approaches is a relative inability to identify the more abstract concept of a binary developed for the purpose of committing advertising fraud.

Without the reverse engineering, analysis, and cross correlation of a large cross section of malware developed for the purpose of committing advertising fraud, it may be challenging to develop a sufficiently accurate baseline of behaviour signatures. Without the continuous analysis of newly created advertising fraud malware, it may also be challenging to maintain an effective set of behaviour signatures.

The number of signatures required for an effective baseline may vary depending on the complexity of the malware, among other factors. Some malware is configured to employ various techniques to obfuscate or mask its behaviour, especially when there are indications that it is being monitored (such as in a sandbox).

For simple, non-obfuscated malware, a single signature may be enough for positive selection, however in the case of heavily obscured and/or obfuscated malware, there may be a need to utilize numerous filters to remove known malware classifications and establish that the malware has not been identified before.

In these cases, the malware that cannot be positively identified may be identified as being simply of interest and potentially requiring further review (e.g., a manual review by an analyst may be conducted).

In some embodiments, a system is provided that builds upon the foundation provided by some current binary classification systems to develop higher level and potentially more abstracted signatures based on the behaviours identified as unique to advertising fraud malware.

By filtering and selecting on these lower level behaviours, the system may be configured to map the behaviours in relation to the goal of the binary (e.g., identifying and/or determining various characteristics associated with the goal of the binary).

In some embodiments, a process may be provided for the automatic identification of malware developed for the purpose of committing advertising fraud, through abstracting traditional binary analysis data into high level signatures, using a set of advertising fraud behaviour signatures, and a binary analysis process.

Using more abstract higher level signatures as opposed to low level behaviour signatures may allow for greater accuracy and flexibility when identifying malware. For example, FIG. 9 of U.S. Patent Application No. 62/157,195 (incorporated by reference herein) provides an illustration of example API calls which may be observed. These can be translated into a low level behavioural signature that identifies the malware as "Registry key value created" shown, for example, in FIG. 10 of U.S. Patent Application No. 62/157,195.

However, a higher level signature might take into account the purpose of the registry key that is set and would identify the malware as "COM browser emulation set—possible click fraud" as illustrated in in the following example logic structure below:

```
#COM browser emulation set
def sig_123(behaviour):
    if behaviour.find({'regisry':{activity':'value created', 'key':
    'FEATURE_BROWSER_EMULATION',}}).count( )≥1:
        return True
    else
        return False
```

Building on Binary Classification Systems

By executing binary code in an environment that may include various sensors, the behaviour of the code can be observed by these sensors. The sensors may collect data about the code during runtime execution for further behaviour analysis.

This observation may be referred to as "dynamic analysis" herein, and the instrumented code execution environments may be referred to as one or more "sandboxes".

Depending on the coverage and precision of the sensors in the environment, the amount of behaviour observed may vary.

In order to ensure the minimum amount of behaviour is observed in order to differentiate between the purposes of binary code, the following information may be collected by the sensors:

Interception of programmatic calls to the operating system kernel interface (e.g., in the Windows operating system this is referred to as the "Windows API", although other operating systems may be considered, such as Unix or Unix-like operating systems, including Linux, OS X, BSD, Chromium OS, OS/2, AIX, or the like). For each programmatic call, the following may be recorded, among others:

API call name and memory address (e.g., a pointer or address register location);

Chronological order of call;

Parameters passed to the call (although this may not be practical where multiple pointer dereferencing is required); and Thread ID and/or process name associated with the code that issued the call;

Names of files created, deleted, and/or accessed;

Registry keys created, deleted, and/or accessed;

attempted creation of mutex (e.g., program objects allowing multiple program threads to share a resource);

Raw network traffic (e.g., TCP/IP, UDP, FTP, SSH, and/or telnet) generated during code execution;

One or more lists of domain names, IPs, and URL query strings from HTTP traffic generated during code execution and other types of information including, for example, MAC addresses, GET/POST requests, Javascript, ActiveX, and WebSockets.

The amount of behaviour observed may be dependent on the amount of time that the malware may be allowed to run, as well as the complexity of the malware. Typically, simple malware that is not obfuscated or protected against analysis can be run over a shorter period of time than heavily obfuscated malware.

The main factor in determining how long the malware is run (and how much behaviour may be collected) is the amount of positive identifications by a selector. For example if the malware triggers one or more positive selectors, it may be categorized and further analysis may not be required. If however, no positive selectors are triggered (e.g., only filters or nothing at all), then the malware must be run a second time for a longer duration.

Typically, the malware sample may be run for a number of minutes (e.g., two minutes) and generate a number of raw behaviour attributes (e.g., 40,000).

By analyzing the observed behaviours of the executed code, the binary can be categorized. This behaviour analysis may be performed by applying a set of filters and selectors to the aggregate of the information collected by execution environment sensors. This set of selectors and filters may be referred to as a "behaviour signature".

In some embodiments, the filters and selectors that make up a behaviour signature operate such that a positive match on a filter will remove the binary from the signature category and a positive match on a selector will add a binary to the signature category.

The particular sequence of application of filters and selectors may be considered in the generation of behavioural signatures. For example, the order, the arrangement and/or the permutations of filters and selectors may impact the accuracy of generated behavioural signatures.

An example of sequencing for a selector may include the following sequence of API calls from the same thread within a given period of time: GetProcAddress, VirtualProtect, VirtualAlloc, VirtualProtect. This sequence of API calls could be used to describe a signature to detect "code injection" as shown in the exemplary logical sequence below:

```
#code injection
def sig_125( ):
    for seed in behaviour.find({'api':{'call':'GetProcAddress'}}):
        try:
            if seed.next.call == 'VirtualProtect':
                if seed.next.next.call == 'VirtualAlloc':
                    if seed.next.next.next.call == 'VirtualProtect':
                        return True
        except:
            continue
    return False
```

In some embodiments, classification processes described herein do not focus on the underlying sandbox technology used to execute the binary and observe the behaviour. Instead, the focus may be placed on:
the ability to use multiple sandboxes in parallel to analyze thousands of binaries concurrently and,
the process of filtering and selecting identified behaviours to create behaviour signatures such that a set (in some embodiments, a unique set) of behaviour signatures may be developed to identify malware that was developed, at least in part, for the purpose of committing advertising fraud.

Signature Set

The set of behaviour signatures that have been developed for identifying malware engaging online advertising fraud may be important for conducting automated binary analysis and code categorization.

In order to commit advertising fraud, malware may be required to fetch the Uniform Resource Locators (URLs) for advertisements that it may be targeting and load the URLs in a (simulated or real) web browser. Behaviour signatures may be developed that identify this behaviour, based on combinations of the following example behaviours during execution of the binary:
strings that are written to memory;
pattern matching on network traffic that may be generated;
sequences of API calls that are commonly used to implement network protocols; and
sequences of API calls that are commonly used to implement cryptography.

Other combinations and/or other behaviours may be contemplated and/or used, and the above are provided as examples.

In some embodiments, there are two major categories of advertising fraud malware: those that attempt to hide fetching and browsing of advertising URLs from users of the infected host, and those that attempt to involve the user in this activity.

By developing signatures to individually target these categories, a system may be able to further improve the identification capabilities.

Behaviour signatures may be developed that identify advertising fraud malware that attempts to hide malware behaviour from users, based on combinations of at least some of following behaviours during execution of the binary:
strings that are written to memory;
altering or creation of registry keys and/or configuration files for a web browser (e.g., for the Internet Explorer browser, creating or altering the FEATURE_BROWSER_EMULATION registry key to specify the Internet Explorer browser version to be simulated when using the Windows web browser COM object);
hooking API calls to functions that can be used to provide visual or audio queues to the user that there may be a hidden web browser on their host (e.g., hooking the API calls to display a message box, or to play sounds);
API calls associated with the creation and control of a web browser; and
API call parameters that hide windows (and/or other graphical user interface elements) when they are created, and API calls that can be used to create multiple desktops or mobile screens.

A person skilled in the art will appreciate that other combinations and/or other behaviours may be contemplated and/or used, and the above are provided as examples.

In some embodiments, behaviour signatures may also be developed to identify advertising fraud malware that attempts to involve users in its behaviour, based on combinations of at least some of the following behaviours during execution of the binary:
strings that are written to memory;
altering or creation of registry keys and/or configuration files for web browsers other than Internet Explorer; and
API calls associated with the installation of a web browser plugin or extension.

Other combinations and/or other behaviours may be contemplated and/or used, and the above are provided as examples.

Signature tuning may have manual aspects to the process, such that an analyst may review and implement new and/or altered signatures. In some examples, signature tuning may involve using data mining processes, heuristic processes, machine learning, and/or co-efficient tuning.

However, in some embodiments the creation of new signatures can be automated. Signatures can be created by identifying common traits between similar classifications of malware. Commonalities may be identified, for example, using correlation analysis, regression analyses, various grouping algorithms, or the like.

To automate this process, behavioural attributes for malware samples that are known to be part of a classification can be collected.

Various sorting algorithms may be used to group the behaviours and identify the most common behaviours across the samples. In some embodiments, these behaviours can be turned into signatures. The sorting algorithms may sort based on various aspects of the behaviours, such as similarities, targets, type of behaviour, or the like.

In some embodiments, signatures are configured to be combined and/or used together (e.g., build on top of each other) to form more abstract identifiers, such as to answer the question "is this advertising fraud malware or not?". For example, a hierarchy of signatures may be developed. This hierarchy of signatures may be unique in the application to identifying advertising fraud.

An example of these signatures is provided. For example, memory string identification may involve a straightforward regular expression-matching signature. In this example, the system may be identifying a common string that may be found in ad-fraud malware that may be defrauding cost-per-click (CPC) ads. An example code sample for expression-matching is given below:

```
#memory strings url CPC sid
def sig_127( ):
    regex = re.compile(r'.*sid\=\{aid\}.*')
    if behaviour.find({'mem_strings':regex}).count( ) >= 1:
        return True
    else:
        return False
```

As another example, signatures that focus on traffic capture are very similar to the regular expressions that are applied to in-memory strings. A difference is that the data the traffic capture signatures act on has been pre-processed and converted from the packet capture (PCAP) traffic capture format into strings.

In the example signature sample shown below, the system is identifying a URL that may be commonly associated with advertising traffic feeds:

```
#ad feed URL
def sig_130( ):
    regex = re.compile(r'.*feed\?.*')
    if behaviour.find({'traffic':{'http':{'url':regex}}}).count( ) >= 1:
        return True
    else:
        return False
```

On their own, the signatures described for the above examples may not describe more than the immediate behaviour they are identifying. However the system may combine these signatures into a meta signature that may be used to identify "malware that may be committing advertising fraud". An example of such a meta signature is shown below:

```
#malware - click fraud - CPC
def sig_203( ):
    if sig_130( ) and sig_127( ) and sig_125( ) and sig_123( ):
        return True
    else:
        return False
```

Technical Implementation

The technical implementation described herein is intended to provide an overview of the technical components of the process, according to some embodiments.

Figure 4:
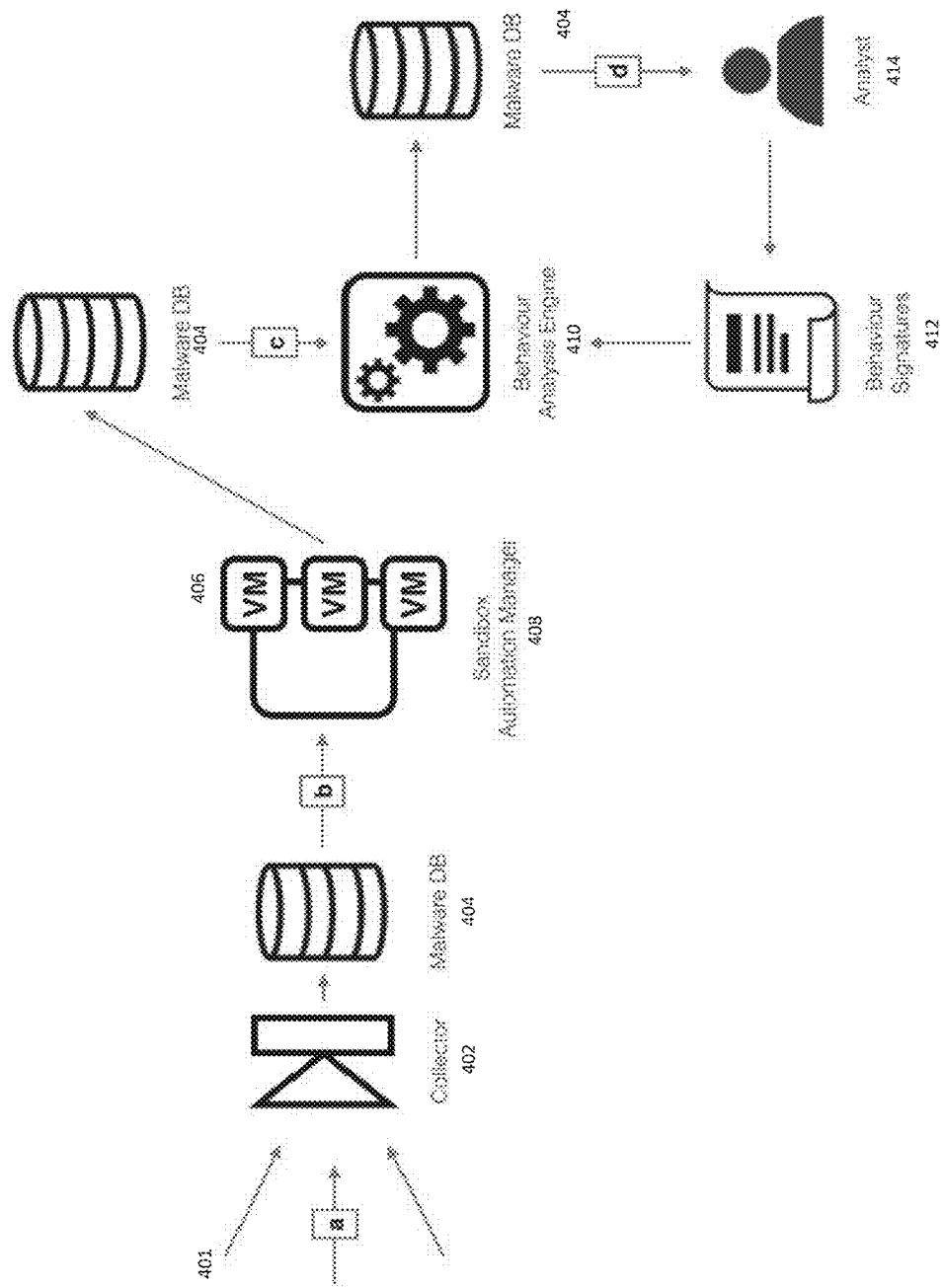
FIG. 4 is a schematic diagram of some of the technical components used for advertising fraud malicious software botnet detection, according to some embodiments.

FIG. 4 provides an example schematic of some of the technical components for advertising fraud malicious software botnet detection, according to some embodiments. The Collector 402 receives binary sample feeds 401 which are stored on the malware database 404 and provided for execution in various sandboxes 406, managed by the sandbox automation manager 408. The behaviour analysis engine 410 applies behaviour signatures 412 and identifies the binary as advertising fraud malware or not advertising fraud malware. Where the behaviour analysis engine cannot make a determination, the binary is marked as failed, and may be sent to an analyst 414 for further review.

a. Collector and Malware Database

The Collector 402 may be a process configured to run clients to poll binary sample feeds such as new malware submissions to malware/virus databases (e.g., Virus Total™) and automatically download new binary samples 401. The Collector 402 may also provide a web interface that allows analysts to manually submit binary samples 401.

Once the Collector 402 has downloaded a sample, the Collector 402 may be configured to conduct a preliminary check on the binary header to verify that it may be a valid executable for an operating system (e.g. Windows, Linux, or the like). If it is not valid, the binary may be discarded. If the binary is valid, then MD5 and SHA256 hashes may be generated and the binary may be added to a Malware Database 404 as a binary blob along with the hashes.

For example, the Malware Database 404 may be a nosql™ data store that serves as the central store for all data and binaries involved in the analysis process. This database provides web service connectors for interaction with the data. Other types of databases may also be used, such as relational databases, SQL-based databases, flat files, or the like.

In some embodiments, the data model implemented in the database schema may include the following data associated with each binary sample:

MD5;
SHA 256;
Binary file;
Status ("new","enriched","failed","complete");
Behaviour—list of defined behaviours and attributes;
Ad_Fraud—boolean True/False; and
Family—name of known groups of similar advertising fraud malware.

b. Sandbox Automation Manager

The sandbox automation manager 408 may be configured to retrieve binaries from the Malware Database 404 via a web service. Binaries that have not been analyzed may be marked as "new" in a Binary Database. The Binary Database may be implemented using various database technologies, such as relational databases, non-relational databases, or the like.

For each binary, the sandbox manager 408 may provide and/or provision a special virtualized operating system (e.g. Windows, Linus or the like) that may be instrumented with sensors (referred to hereinafter as a sandbox 406 ). The manager 408 may be configured to execute the binary file in the sandbox 406 and collect the data observed by the instrumentation sensors. The sensors that may be used and the duration that the binary may be executed for can be configured by an analyst 414, or be based on various rules that may be automatically applied by the system and/or refined over time. The sensors may also be referred to as 'instrumentation' sensors.

The data that may be collected from the instrumentation sensors may be formatted into text key, value pairs and sent to the Binary Database for storage and association with the stored binary and hash values. The status of these binaries may then be changed from "new" to "enriched".

A management controller is utilized for the sandbox technology that may be configured to provide parallelization capabilities in relation to the sandboxes. The management controller may be configured to scale the number of concurrent running sandboxes at a rate dictated by the raw resources available on the platform (e.g. CPU, memory, and disk IO) as opposed to the limits of the controller.

A sandbox may be an instrumented environment (hardware or virtualized) in which a binary (or a portion of the binary) may be run and its behavior may be captured. A single sandbox instance may be capable of running a single binary for a specified period of time to capture its behavior. In the context of this specification, analyzing a malware by running it in a sandbox may be called dynamic analysis. A typical method for scaling malware dynamic analysis may be to run multiple sandbox instances on the same machine and to coordinate malware distribution and data collecting using a sandbox controller. A sandbox controller may be responsible to dispatch malwares to sandbox instances and collect analysis data from sandbox instances upon finishing the analysis.

A typical server with 64 GB of random access memory (RAM) and a quad-core CPU may be capable of running 10 parallel sandbox instances at the same time. To increase the number of parallel sandboxes, the physical machine may need to be scaled up, which means an upgraded machine with more RAM and more CPUs or more powerful CPUs may be needed, which could be costly. Increasing parallelism by scaling up the server may be limited to the most powerful server available in the market, and as a result, parallelism may not be able to grow indefinitely.

Parallelism can also grow using a scaling out strategy. Scaling out may be achieved through distributed parallelization. As opposed to scaling up, scaling out may not require upgraded servers and it may not be limited by the capacity of a single physical machine. Parallelism can scale out by distributing sandbox instances over a cluster of commodity servers. This strategy may result in increased scalability. A central controller may be configured to dispatch malware among sandboxes and may collect the analysis results. Central controller and sandboxes do not need to be on the same machine (however, in some embodiments, they are on the same machine). New sandboxes can be added to ecosystem by adding more hardware.

Using a scalable, fault-tolerant and distributed architecture for running multiple instances of sandboxes in parallel using scaling out strategy may provide the following advantages:

A higher degree of parallelism can be achieved by adding more hardware (e.g. commodity servers), and sandboxes can be distributed over a number of (e.g., hundreds) of servers.

Sandboxes can be deployed over multiple datacenters across multiple geographic areas, which helps to achieve more accurate dynamic analysis because some malware may only run if executed in a specific geographic area.

The system may be more fault-tolerant and resilient than a conventional system because:

Failure of a local sandbox controller on a single machine may not result in the failure of the overall system; and Failure of a datacenter or its network may not result in the failure of the overall system, which potentially improves the disaster recovery capabilities of the system.

In some embodiments, the following features may be designed and developed to create a scalable, fault-tolerant and/or distributed architecture for running multiple instances of sandboxes in parallel:

the controller and sandboxes communicate using Restful API architecture;

malware can be prioritized for analysis, which helps the analyst to speed up the analysis of certain malware, if needed;

the controller uses message bus technology to send/receive malware/analysis reports to a storage/malware repository, and message bus technology allows for high concurrency, availability and reliability;

customized settings for individual malware may allow for customized analysis, including but not limited to:
  target environment (e.g., Windows XP, Windows 7);
  installed software packages (e.g., MS Office, Adobe Acrobat); and
  analysis duration;

optimized matching between malware and sandboxes based on matching algorithms (such as the stable marriage problem algorithm) which improves the throughput of malware analysis; and remote commanding and controlling of individual sandboxes via Restful API.

Data transfer between the malware repository, data storage, controller and sandboxes may need to be reliable, highly available and fast. Message bus technology may be used to transfer malware and analysis results between the malware repository, data storage and sandbox controller. Malware and analysis results might be transferred as one single message via the message bus or may be broken into multiple parts depending on the file size. Message assembly techniques may be utilized to assemble partial messages to build the original malware file or analysis results upon delivery. Also, messages may be compressed using various compression algorithms (such as the 7z archive format compatible with the 7zip utility), which may reduce the network traffic during data communication.

Data transfer between sandbox controller and individual sandboxes may be done using the RESTful API architecture. Representational State Transfer (REST) is a software architecture style comprising guidelines and practices for creating scalable web services. REST is a coordinated set of constraints applied to the design of components in a distributed hypermedia system that can lead to a higher performing and more maintainable architecture. RESTful architecture implementation may be technology agnostic which means clients and servers in RESTful architecture can be developed using different programming language. This feature may allow for cross platform development and deployment of controller and sandboxes. Malware may be submitted to an individual sandbox using a devised upload RESTful API. Likewise, the analysis results may be downloaded from a sandbox using a devised download RESTful API.

RESTful API architecture may be used to implement the command and control infrastructure between controller and sandboxes. Commands such as "restart the sandbox", and "check sandbox health status" may be sent to sandboxes by the controller and the responses may be collected using a devised RESTful API.

c. Behaviour Analysis Engine

In some embodiments, the Behaviour Analysis Engine 410 may be utilized as part of the analysis process. The engine may be configured to scan the Malware Database 404 for binaries with a status of "enriched" and retrieves their behaviour data for analysis.

The behaviour data may be first translated into data structures that can be interpreted by the behaviour signature analysis engine, then the behaviour signatures may be applied to the normalized data. The filters and selectors in the behaviour signatures may be compared against the normalized data and the binary may be either identified as advertising fraud malware or not advertising fraud malware, based on the output. The results of the analysis and a status of "complete" may be communicated back to the Binary Database.

If a decision cannot be made classifying the binary as advertising fraud malware or not, the binary's status may be marked as "failed" in the Malware Database. A "failed" status may be an indicator for an analyst to manually run these "failed" binaries again after tuning the signatures, or for an analyst to manually review the binaries.

In some embodiments, the system is configured to automatically re-run any binaries classified as "failed" after a pre-determined period of time, or following a tuning of the signatures.

d. Analyst

In some embodiments, an analyst 414 is responsible for tuning the behaviour signatures. These signatures may be tuned by analyzing and reverse engineering the binaries from the automated classification process identified as malware used to commit advertising fraud. The analysis process may be automated and/or semi-automated, for example, applying the use of machine learning, heuristics, and so on.

During manual analysis, behaviours that are unique to advertising fraud malware may be identified and correlated with behaviours identified in other advertising fraud malware that has been analyzed. These behaviours may be converted to signatures and provided to the Behaviour Analysis Engine 410.

The analyst may also monitor binaries for failed behaviour analysis and failed goal identification.

Advertising Fraud Infrastructure Infiltration

In this step, one or more processes are described for instrumenting and monitoring online advertising fraud botnets. The processes may be conducted by a system configured for instrumenting and monitoring online advertising fraud botnets.

Botnets that are developed and operated to commit online advertising fraud, may have some of following components:
  client (bot)—code that may be installed on a host either as a stand-alone executable or as dynamic code that may be executed in a web browser. A purpose of the bot may be to receive (or request) URLs from a server that are, or redirect to, online advertisements. The bot either simulates user behaviour to fetch these URLs or attempts to trick a user into manually fetching the URLs. The botnet operator may be paid a small sum for each URL that is successfully fetched.
  command and control server (C2)—a server that controls the bot and sends it the advertising URLs via a communication channel.

For an advertising fraud botnet to be operational (actively committing advertising fraud), the bot may need to be in continuous contact with the C2 server so that it can receive the advertising URLs to fetch. This is a characteristic that distinguishes advertising botnets from other types of botnet, such as those that commit "ransomware" or "banking credential theft".

Another potential differentiator between advertising fraud botnets and other botnets is that the installation of an advertising fraud bot on a host may have relatively little impact on the victim who owns and/or is otherwise associated with the host.

The bots may be used to defraud advertisers, and not the owners of the hosts that they are installed on. The process used to provide instrumentation to and monitoring of advertising fraud botnets also differs from monitoring other types of botnet.

After attempting traditional practices of monitoring advertising botnets though the tracking of C2 IP addresses and domains, and running the bots in sandboxes to develop signatures, it was observed that these methods were not providing the information required; namely which advertisers were being defrauded, and which exchanges the botnet operators were abusing to receive advertising URLs to fetch.

In order to gain the required information, the Applicants attempted to run the live bot samples in a controlled environment and trace their network traffic to identify the defrauded advertisers, and exchanges through their domain names. This is called "sandbox analysis". While some limited success was obtained with this method, there was no control over how the malware executed, and it was necessary to wait for the malware to request URLs. Scaling this process is not optimal, as each instance of the malware would need a new operating environment. Many malware samples also used some form of encryption to secure their communication to the C2, so this traffic could not be analyzed.

To alleviate these issues, some embodiments provide systems and methods and computer system products to analyze the bot's binary code through a combination of dynamic analysis (where the bot may be run with a debugger attached) and static analysis (where the system is configured to disassemble and decompile the binary code into human-readable symbolic representation of the code). Using these two techniques, the system may be configured to identify the algorithms that are used to manage the communication between the bot and the C2. For example, the algorithms may be a combination of network protocol implementations and cryptography.

Once the system has identified the communication and encryption algorithms, the system may be configured to re-implement the algorithms in a client configured as a "Milker". The Milker may then be configured to communicate with the C2 and fetch the advertising URLs. By using a Milker that is under the control of the system, the system may be able to control the rate at which the URLs are fetched. As the system controls the encryption/decryption of the traffic, the use of encrypted traffic may no longer be a barrier, and the system may be further configured to scale the implementation of the Milker.

Example Implementation

Using some embodiments of an analysis process described above, a process may be provided for the instrumentation and the monitoring of advertising fraud botnets. An overview of this process may be provided below.

Figure 5:
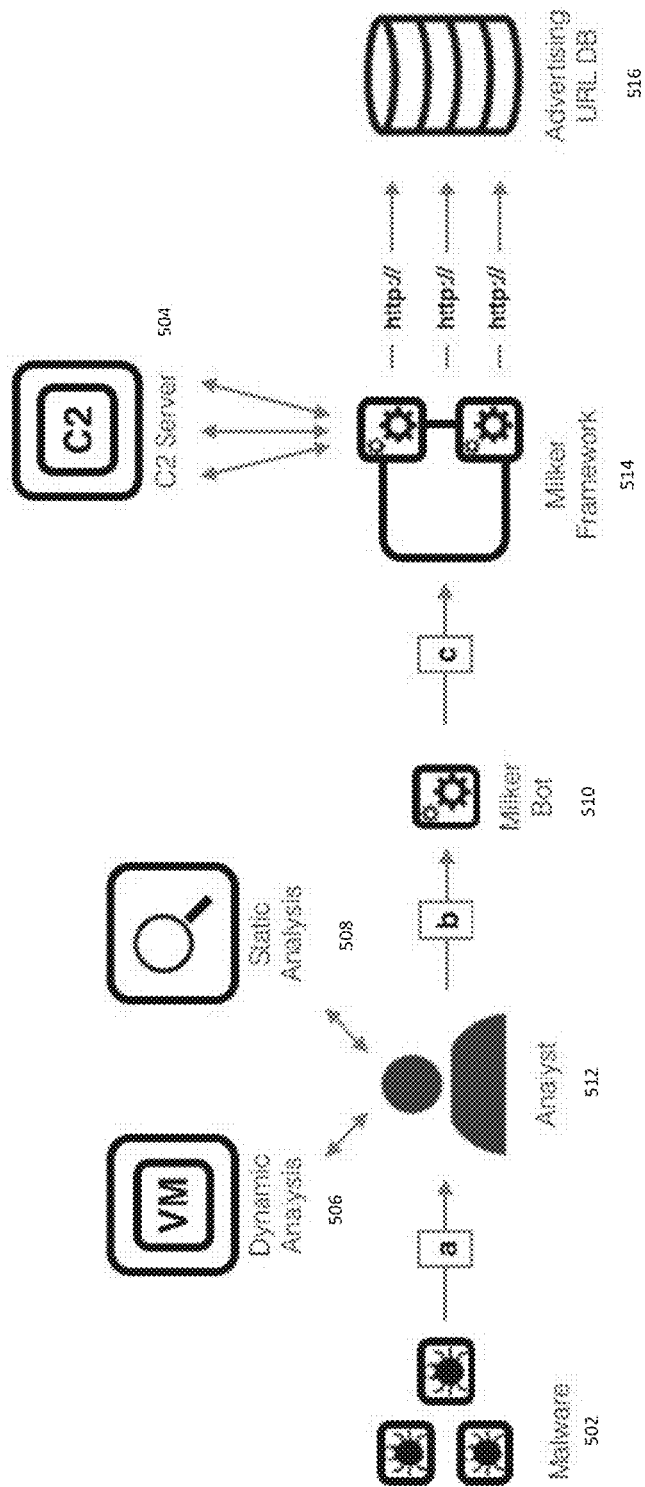
FIG. 5 is a schematic diagram of some of the technical components used for advertising fraud infrastructure infiltration, according to some embodiments.

FIG. 5 is an example schematic of some of the technical components for advertising fraud infrastructure infiltration, according to some embodiments. The technical components may include the conducting of dynamic analysis 506 and/or static analysis 508 of malware 502 for the provisioning of one or more 'milkers' 510 for communication with one or more command and control servers 504. The operation of the milkers 510 can be controlled to identify the algorithms used to manage communication between bots in a botnet and the command and control server.

In some embodiments, a method is provided for monitoring a network of compromised computing devices executing malicious software including instruction sets for accessing advertising weblinks. The method may involve identifying one or more communication and encryption processes used by the compromised computing devices to communicate with at least one control server providing access to advertising weblinks. The method may involve communicating, by a Milker bot interface to the control server, one or more requests for advertising weblinks, and using the identified one or more communication and encryption processes to mimic one or more requests from a compromised computing device. The Milker bot interface is operable to run multiple Milker bots in parallel. The method may involve receiving the one or more advertising weblinks from the control server. The advertising weblinks have metadata identifying the control server. The method may involve processing the one or more advertising weblinks to identify and monitor the control server(s).

In some embodiments, the identification of the one or more communication and encryption processes used by the compromised computing devices to communicate with the control server may involve operating a compromised computing device in conjunction with a debugger. The method may involve using the debugger for recording one or more instructions executed by the compromised computing device. The method may involve analyzing the one or more recorded instructions to identify one or more communication and encryption processes used by the compromised computing devices to communicate with the control server.

In some embodiments, the identification of the one or more communication and encryption processes used by the compromised computing devices to communicate with the control server may involve executing, in a controlled computing environment having one or more sensors, binary code used in part by the compromised computing devices to communicate with the control server. The method may involve sensing, by the one or more sensors, information relating to the execution of code. The method may involve analyzing the sensed information to identify one or more communication and encryption algorithms used by the compromised computing devices to communicate with the control server.

a. Malware Analysis

The malware analyst 512 collects malware samples that have already been identified as associated with advertising fraud. In some embodiments, the malware analyst(s) are specially configured computer modules. The malware analyst(s) may then use a combination of dynamic and static analysis (or dynamic and/or static analysis individually) of the binary code to determine (e.g., reverse engineer) the algorithms used by the malware to communicate with the C2 server.

Dynamic Analysis

Dynamic analysis of binary code may involve running the binary code in a controlled environment that may be instrumented with various sensors to collect information about the code execution and its effect on the environment. Two methods to collect information include executing the binary in a sandbox or executing the binary with a debugger attached.

A sandbox refers to a virtual instance of an operating system that has been instrumented to collect information regarding how the binary interacts with the operating system, for example by collecting the programming calls that the binary communicates to the operating system's kernel interface.

The expression 'Debugging a binary' refers to the process of monitoring and controlling the execution of a binary by using a debugger that monitors events generated by the operating system as a result of executing the binary code. The debugger may have the ability to write to the process memory of the binary during run time, which gives the debugger the ability to control code execution flow.

Static Analysis

Static analysis refers to the process of disassembling binary machine code into human readable assembly code and/or decompiling machine code into human readable pseudo code, using various programming languages, such as the C programming syntax.

After the decompiling or disassembling, an analyst or a computer module then reads and/or interprets the code to gain an understanding of the algorithms.

There may be multiple algorithms used to communicate with multiple C2 servers for different purposes. The analyst(s) may identify the algorithms used to fetch the advertising URLs from the C2 server.

b. Milker Bot Development

Once one or more analysts have identified and/or determined (e.g., reverse engineered) the algorithms used by the malware to fetch advertising URLs (or other form of reference or electronic pointer to a resource) from the C2 server, the process proceeds to developing and configuring a Milker 510 that implements these algorithms and mimics the communication of the bot to the C2.

The Milker 510 may be developed to provide a common interface that can be used by the milking framework 514 to control the Milker.

c. Milker Framework

The Milker framework 514 may be a process, implemented by the system, that may automate the Milker 510 interaction with the C2 servers. Once a Milker bot has been added to the Milker framework, the framework may be configured to command the Milker to poll the C2 server at a defined rate and download the advertising URLs. The URLs may then be stored in a database 516 for analysis. By designing the Milker bots to utilize a common interface, the framework may be able to scale the number of URL requests as needed by increasing the request rate per Milker bot and by running multiple Milker bots in parallel.

A simplified sampling of the process is provided as an illustrative example. In this example, dynamic and static analysis of a known ad-fraud bot is used to identify traffic and encryption algorithms. The process may be implemented in a Milker. Screenshots of such a process of developing a milker can be found, for example, in FIGS. 18-21 of U.S. Patent Application No. 62/157,195, which is incorporated by reference in its entirety.

First, as part of a dynamic analysis, the malware is run in a sandbox and the resultant network traffic is captured. As an example, a malware application may issue an HTTP request for a URL starting with "/pgt?" and receive what appears to be an encrypted response.

Having identified a URL used by the malware and the fact that the communication is encrypted, the system may then be configured for static analysis. The system disassembles the malware and reviews the code, looking for that URL. In some embodiments, the strings in the binary may have been encrypted and so they may need to be decrypted manually.

After locating the URL string in the code, the system may be configured to trace the function calls around the URL to identify the algorithm responsible for sending the HTTP request.

Next, the system may be configured to trace the function calls until the function that is used to decrypt the encrypted traffic is found.

For this example, the encryption may be a base64 encoding followed by an rc4 encryption routine. Other types of encryption routines may be utilized.

At this point, the system may have both the algorithm for the traffic protocol and the encryption. These algorithms may then be utilized in the development of a Milker.

The Milker can be scaled by running multiple parallel instances of a single Milker. Because the Milker may be a self-contained module that transmits requests, parses the response, and reports the data, there may be a number of Milker modules that can be run in parallel.

The rate of request from the Milker can also be controlled directly by the analyst, allowing for a high volume of requests.

An interface may be provided as a messaging-oriented middleware that facilitates the creation of a flexible application architecture that may be data centric. By moving to a loosely coupled design using the interface, the Milker platform architecture may, in some embodiments, not be bound to database write performances and can be designed to scale the number of URL requests as needed.

Figure 9:
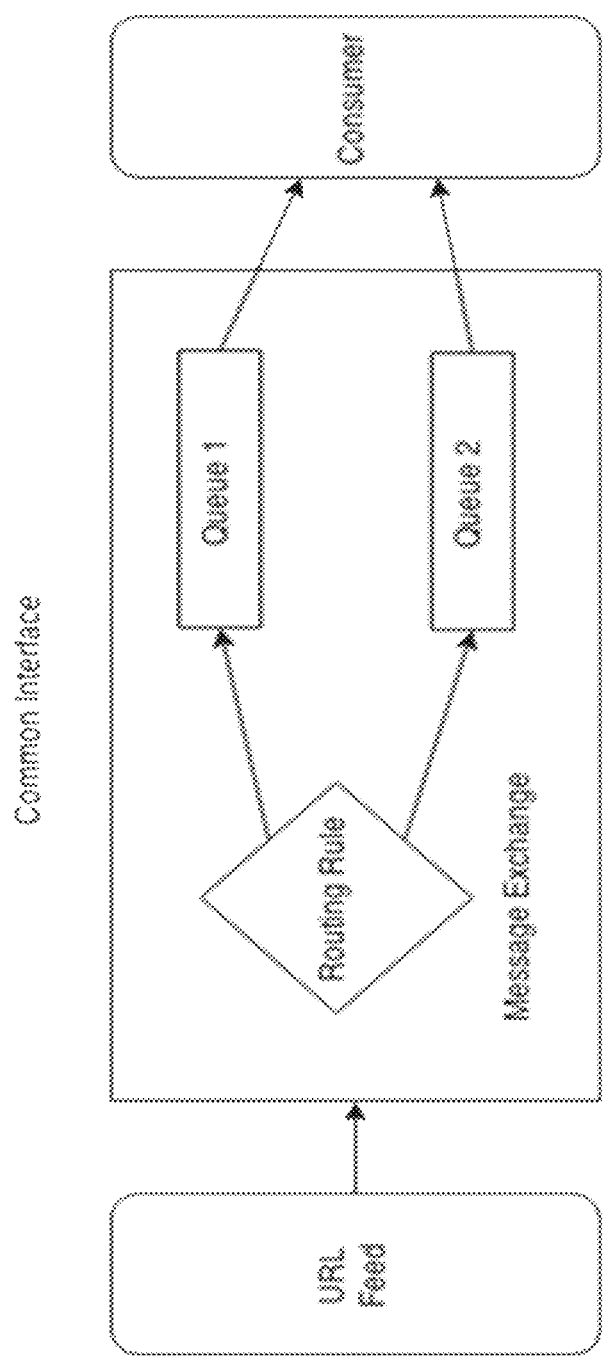
FIG. 9 is an example flowchart of an interface, according to some embodiments.

Without any further modifications and by increasing the request rate per Milker bot and also running multiple Milker bots in parallel, a Milker platform may be able to scale in size and performance. FIG. 9 shows an example common interface.

Identifying non-organic traffic entities

In another aspect, there is provided methods, systems, and media for deterministically detecting publishers, ad networks, and exchanges engaged in sourcing, routing, and consumption of non-organic traffic by means of infiltrating the traffic dispatching infrastructure of distributed networks of compromised machines.

In some embodiments, systems and/or methods are provided to identify entities engaged in sourcing, routing, and consuming of non-organic traffic, and the feed URLs extracted by means of infiltrating the traffic dispatching infrastructure of distributed networks of compromised machines may be stored as a browsing object along with specific attributes, including the timestamp of extraction.

Figure 11:
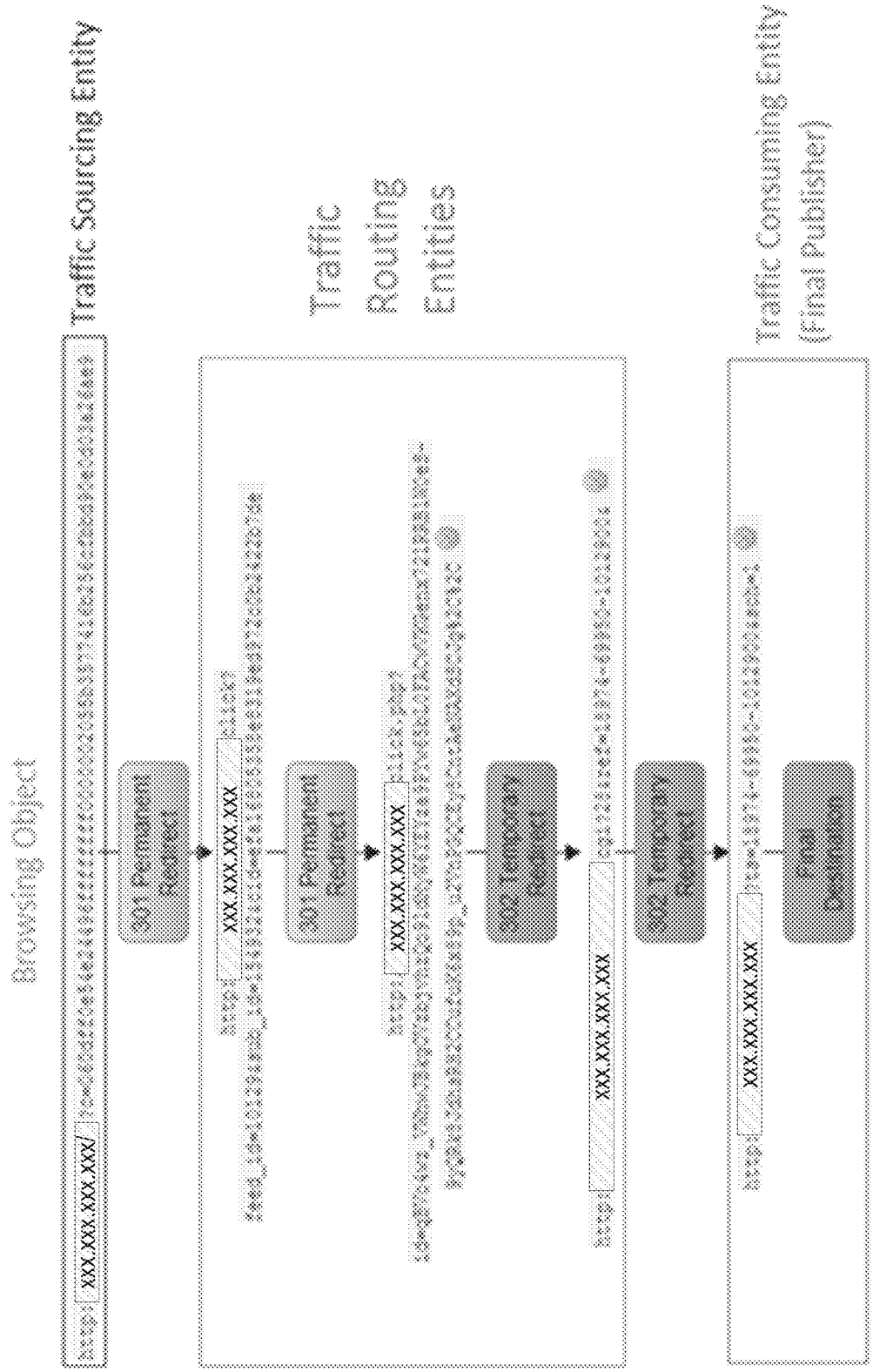
FIGS. 11 and 12 are example flowcharts indicating various links traversed prior to landing at a destination page, according to some embodiments.
Figure 12:
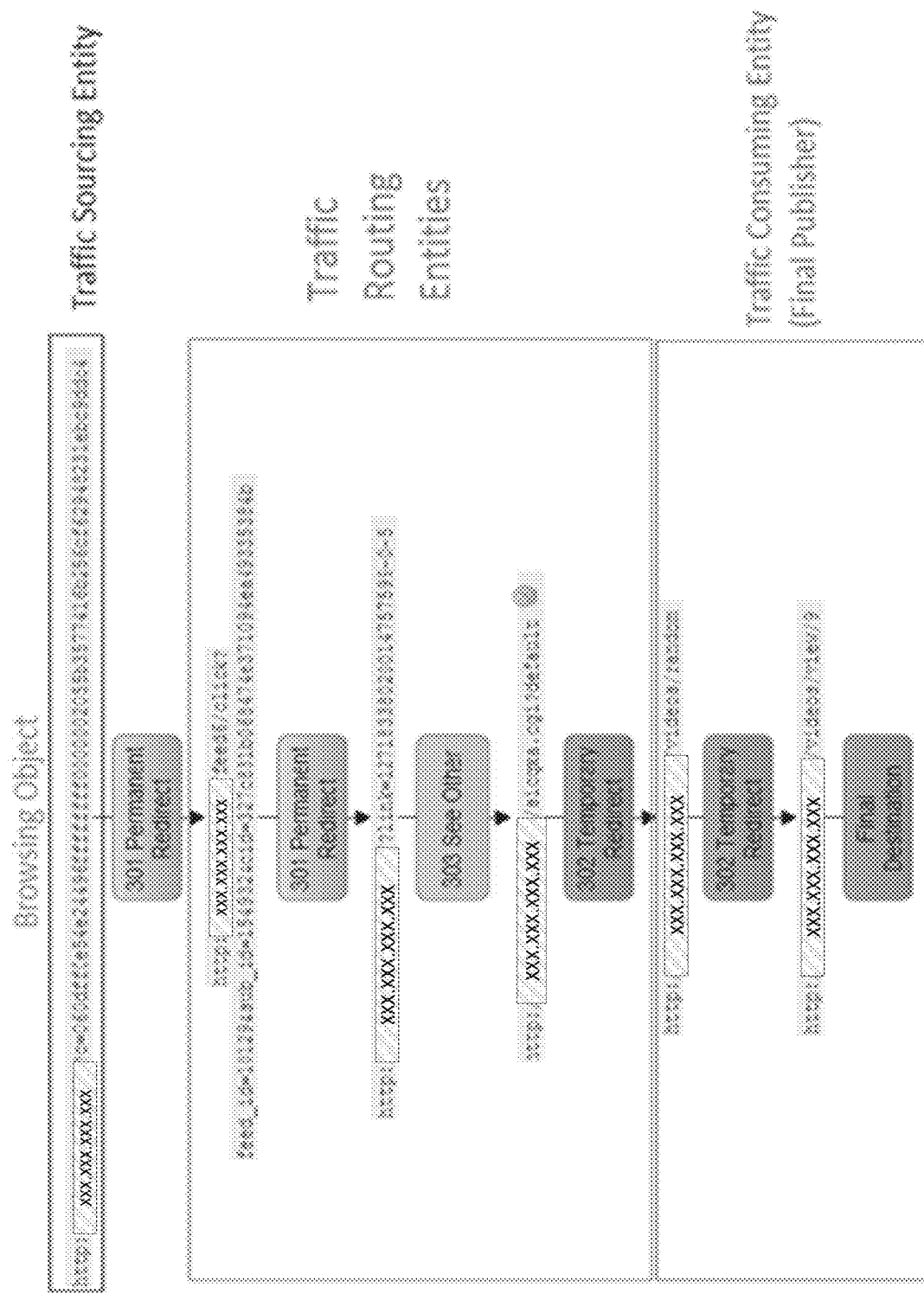

FIGS. 11 and 12 provide example flowcharts indicating various links traversed prior to landing at a destination page, according to some embodiments. As indicated in these flowcharts, there may be a number of destinations provided through a number of different redirections to a final destination (in other words, there may be a number of linkages between the traffic sourcing entity, and the traffic consuming entity.

In some embodiments, a method is provided that is executed in relation to one or more networks to monitor one or more control servers. Each network has one or more characteristics. The method may involve generating one or more browsing objects corresponding to each of the one or more received advertising weblinks. The browsing objects may each include attributes related to characteristics of the one or more received advertising weblinks. The method may involve using the one or more browsing objects, and identifying one or more characteristics of the one or more networks. The method may involve using a distributed dispatcher component to query for browsing objects and schedule workers to trigger actions. A worker may be a stateless object initiated with a browsing object as an input parameter by the dispatcher and may trigger an action based on the input parameter.

For each specific network of compromised machines, certain attributes may be added as required for communication, including but not restricted to, the following: specific HTTP header attributes pertaining to a specific network, specific referrer information as required by a specific network or specific timeout threshold pertaining to a specific feed url type.

The generated browsing object may then be stored, for example, in an in-memory priority queue sorted based on its time of extraction. An in-memory priority queue may allow for faster retrieval times as the system scales to process and store a large number of (e.g., hundreds of millions) objects.

A distributed dispatcher component may be configured for creating and scheduling workers, receiving and dispatching commands, and handling race conditions and/or synchronization.

A worker or worker object may be a stateless object initiated with a browsing object as an input parameter by the dispatcher component. A stateless object may be an instance of a class without instance fields or variables. The worker's responsibility may be to take action according to the type of browsing object received.

The stored browsing objects may be queried by the dispatcher component. Depending on the resources available to the dispatcher component, a worker object may be initiated with the browsing object sent as a message. Upon initiation and receiving a message, a worker may be configured to perform the following actions:

Check timestamp against timeout threshold: if expired, then shut down;

Create output message object;

Create browser object with OS hooks pertaining to but not limited to disabling the sound drive, or disabling message boxes;

Set browser specific parameters as received via the browsing object message including but not restricted to HTTP headers, referrers;

Navigate to browsing object URL parameter;

Check for HTTP redirect events;

Add to the output message intermediary property each redirect url;

Check to see if intended landing page may be reached by registering to the browser's documentCompleted event;

For each event generated, compare the web browser's url against the event's generated url: If equal, the system has reached the intended landing page and is loading the iframes;

Send a stop message to the web browser;

Add to output message the URL of the final landing page;

Set the timestamp for the output message;

Send output message to in-memory queue for further analysis; and

Shutdown.

A person skilled in the art will appreciate that other actions may be contemplated, and the above actions are provided as illustrative examples.

Each URL logged as an intermediary within the browsing session may be classified as a traffic service and depending on its type, may be flagged as engaged in routing non-organic traffic generated by means of distributed networks of compromised machines (e.g., a botnet).

The final landing page logged within the browsing session may be classified as a publisher and flagged as engaged in consuming non-organic traffic generated by means of distributed networks of compromised machines.

Figure 6:
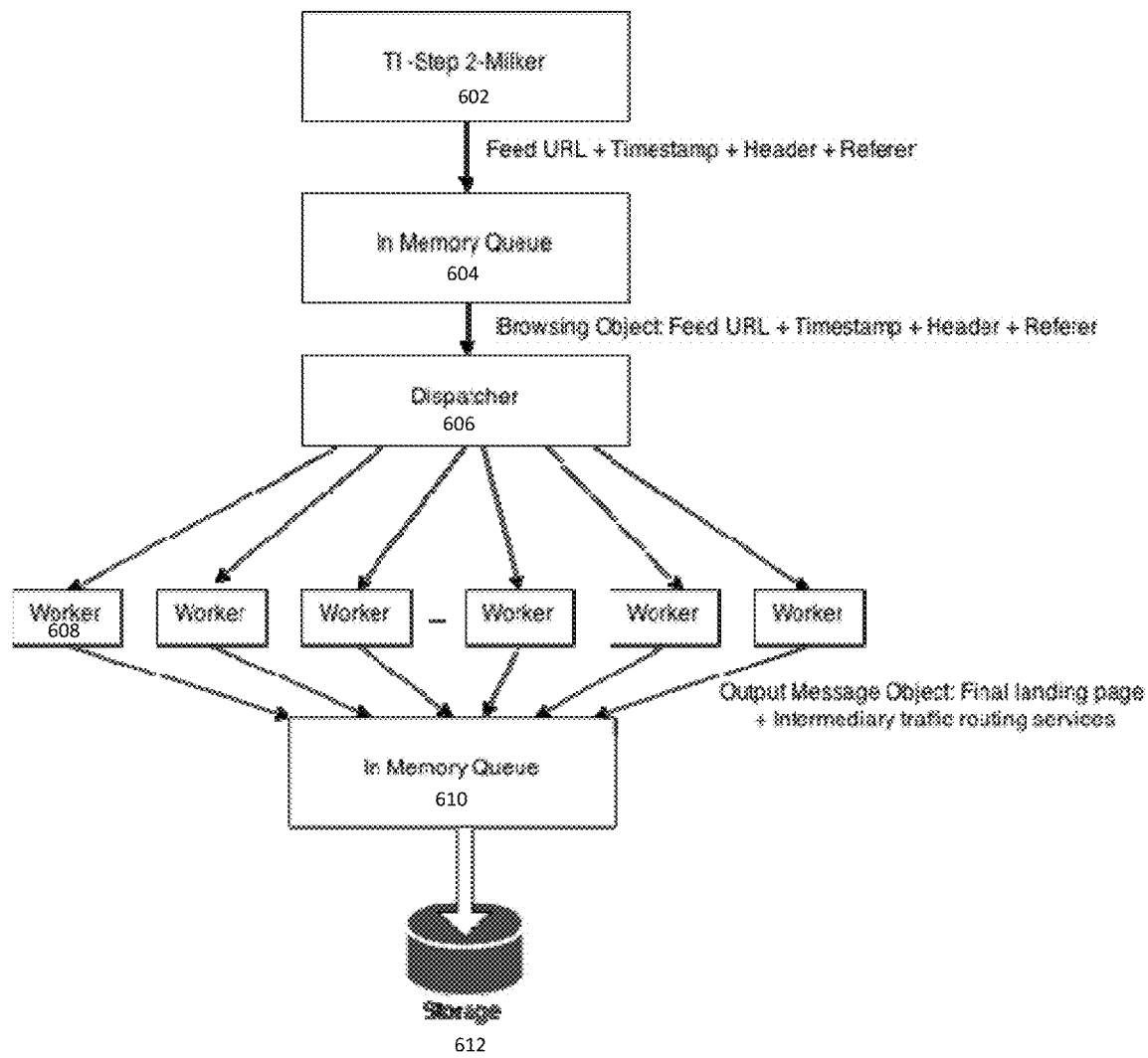
FIG. 6 is a schematic diagram of some of the technical components used for advertising fraud infrastructure infiltration, according to some embodiments.

FIG. 6 provides an example schematic of some of the technical components for advertising fraud infrastructure infiltration, according to some embodiments. As indicated, information may be pulled from the Milker 602 and/or the Milker framework, including the advertising URLs, timestamps, header information and referrer information. This information is used to generate a browsing object stored in an in-memory queue 604, and workers 608 may be dispatched to obtain information related to the final landing page and also any intermediary traffic routing services. This obtained information may be stored in memory queue 610 and/or storage 612.

Potential advantages of the system may include:
1) By means of infiltrating the traffic dispatching infrastructure of networks of compromised machines, the system allows for direct access to the source of non-organic traffic. This in turn, allows for a deterministic detection of entities engaged in sourcing, routing, or consuming non-organic traffic with a high precision rate including, a potentially reduced false positive rate and false negative rates;
2) Due to the nature of this process, all entities, including but not limited to traffic routers, exchanges, and consumers may be identified. Other entities may also be considered including servers, exchanges, data centres, repeaters, and gateways;
3) The volume of non-organic traffic generated via a network of compromised machines may be quantifiable and allows for its measurement;
4) This process allows for the identification of specific time frames where a publisher, ad network or exchange has engaged in sourcing, routing, or consuming non-organic traffic; and
5) In the event of SSL encrypted ads, where traffic between point to point entities is encrypted, the system may still allow for identification of entities engaged in sourcing, routing, and consuming non-organic traffic.

The dispatcher 606 may be configured to operate on a concurrent, distributed, and fault tolerant component built on the following principles:

Event-driven: Requests may be handled asynchronously while non-blocking operations may be employed exclusively;

Scalable: Nodes may be added without having to modify the platform;

Resilient: Fault tolerance strategies may be utilized to facilitate a self-healing system; and Responsive: React to events in an extremely timely manner through a non-blocking, message-based strategy.

Workers may be platform independent and can be initiated and run on both desktop (e.g., Windows™, Mac OS X™, UNIX™, Linux™) and mobile (e.g., Android, iOS™, Windows Phone™) operating systems depending on the preferred or specific browser type.

There may be different types of browser objects. Depending on the type of botnet type monitored, browsing object parameters can take different values. An example of a sample browsing object is provided below:

```
"BrowsingObject": {
    "feedURL":"http://X.X.X.X/?c=
    060dff0b54e240076475824d07bc577d1c1",
```

-continued

```
    "timeStamp": "1424114007",
    "header": "ua-cpu: 64",
    "referer": "http://XYZ.com",
    "timeout":"30"
}
```

Example output results are shown in FIGS. 11 and 12, as noted above.

Local Instrumentation of Advertising Fraud Malicious Software

In another aspect, there is provided a process for instrumenting and profiling online advertising fraud malware in a controlled lab environment.

Botnets that may be developed and operated to commit online advertising fraud may have the following components: a) client (bot) and b) command and control server (C2), as described above.

For an advertising fraud botnet to be operational (actively committing advertising fraud) the bot may need to be in continuous contact with the C2 server so that it can receive the advertising URLs to fetch. This is a characteristic that distinguishes advertising botnets from other types of botnet such as those that commit "ransomware" or "banking credential theft". Once the bot receives the advertising URLs, it may attempt to fetch the URLs using a web browser component that mimics normal user behaviour.

By identifying the differences between the bot web browser component and a standard web browser a "profile" of the bot can be developed. This profile can then be used to identify the bot when it attempts to defraud advertisers. A profile may be an electronic record with code defining characteristics, actions, attributes, and so on, of the bot.

In order to develop a profile for the advertising fraud bot the system may need to direct its web browser component to a server that is under the control of an analyst. This server may then run a series of automated tests on the bot to develop the profile. To achieve this, the system may need to be configured to control the bot from a fake C2 server.

To develop the fake C2 server, the bot's binary code may be analyzed through a combination of dynamic analysis, where the bot may be run with a debugger attached, and static analysis, where the system is configured to disassemble and decompile the binary code into human readable symbolic representation of the code.

Using these techniques (and other techniques), the system may be able to identify the algorithms or processes that may be used to manage the communication between the bot and the C2. This is often a combination of network protocol implementations and cryptography.

Once the communication and encryption algorithms are identified, the system may be configured to re-implement them to provision a C2 server that may be capable of issuing commands to the bot. The system may then be configured to utilize DNS spoofing or IP spoofing in the lab to direct the bot to the fake C2 server.

In some embodiments, a method is provided for creating an electronic profile of malicious software residing on a compromised computing device. The malicious software includes instruction sets for accessing advertising weblinks. The method may involve managing an electronic profile identifying one or more communication and encryption processes used by the compromised computing devices to communicate with a control server, the control server providing access to advertising weblinks. The method may involve directing one or more of the compromised computing devices to communicate with a computing device through re-routing of packets used for communication between the one or more compromised computing devices and the control server. The computing device may be configured to mimic communications between the compromised computing devices and the control server using the identified one or more communication and encryption processes. The method may involve recording information from one or more packets transmitted from the one or more computing devices. The method may involve analyzing the recorded information to update the electronic profile of the malicious software residing on the compromised computing device.

Example Implementation

In an aspect, there is provided a process for developing a profile of an advertising fraud bot. The process may involve operations, including for example:

1. Identifying (e.g., reverse engineering) the bot communication and encryption algorithms and re-implementing them to build a fake C2 server; and
2. Installing the bot on a machine in a controlled lab environment and using DNS or IP spoofing to direct the traffic of the bot to the fake C2 server. The fake C2 server may then be used to request the bot to browse to the test server that may be configured to profile the bot's web browser component.

Figure 7:
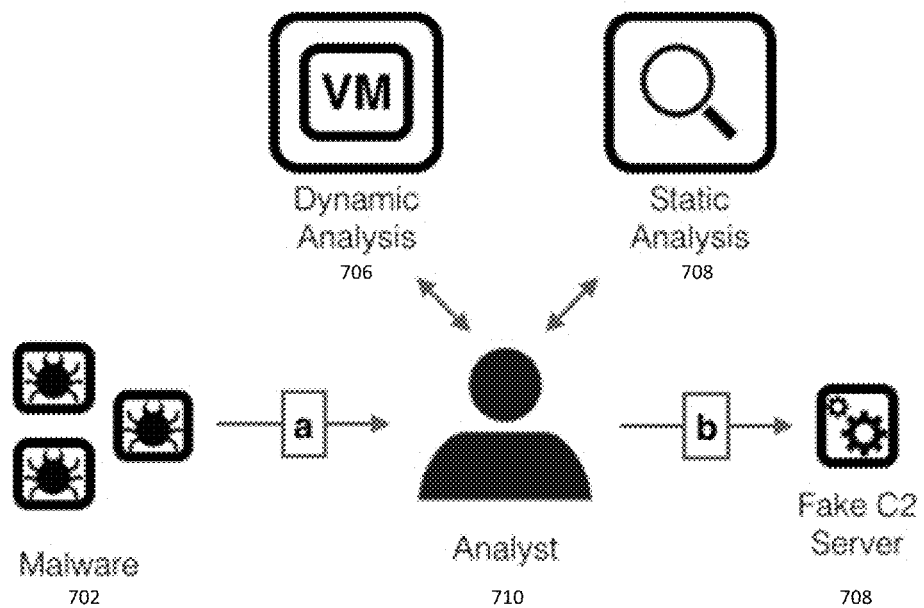
FIG. 7 is a schematic diagram of some of the technical components used for advertising fraud infrastructure infiltration, according to some embodiments.

FIG. 7 provides an example schematic of some of the technical components for advertising fraud infrastructure infiltration, according to some embodiments. As indicated in FIG. 7, the malware 702 is sampled by analyst 710 and examined through static analysis 704 and/or dynamic analysis 706, and a fake command and control server is provisioned.

1. Reverse Engineering The Bot a. Malware Analysis

The malware analyst 710 collects malware samples 702 that have already been identified as associated with advertising fraud. A combination of dynamic 706 and static analysis 704 of the binary code may be used to reverse engineer the algorithms used by the malware to communicate with the C2 server.

Dynamic Analysis

Dynamic analysis of binary code may involve running the binary code in a controlled environment that may be instrumented with sensors to collect information about the code execution and its effect on the environment. Example ways to accomplish this are to run the binary in a sandbox or to run the binary with a debugger attached.

A sandbox refers to a virtual instance of an operating system that has been instrumented to collect information regarding how the binary interacts with operating system, for example collecting the calls that the binary makes to the operating system's kernel interface. Sandboxes may be commodity products that can be purchased or built from public specifications.

Debugging a binary may refer to the process of monitoring and controlling the execution of a binary by using a tool (debugger) that monitors events generated by the operating system as a result of executing the binary code. The debugger also may have the ability to write to the process memory of the binary during run time. Accordingly, the debugger may have the ability to control code execution flow.

Static Analysis

Static analysis refers to the process of disassembling binary machine code into human readable assembly code or decompiling machine code into human readable pseudo code, such as using the C programming syntax.

After the decompiling or disassembling an analyst (or a suitably configured device and/or module) then reads and/or interprets the code to develop an understanding of the algorithms.

There may be various algorithms used to communicate with multiple C2 servers for different purposes. The analyst(s) may identify the algorithms used to fetch the advertising URLs from the C2 server.

b. Fake C2 Development

Once the analyst has reverse engineered the algorithms used by the malware to fetch advertising URLs (or other electronic pointer or reference to online resources) from the C2 server, a fake C2 server may be developed that implements these algorithms and mimics the communication of the bot to the C2.

2. Controlling the Bot in a Controlled Environment

Figure 8:
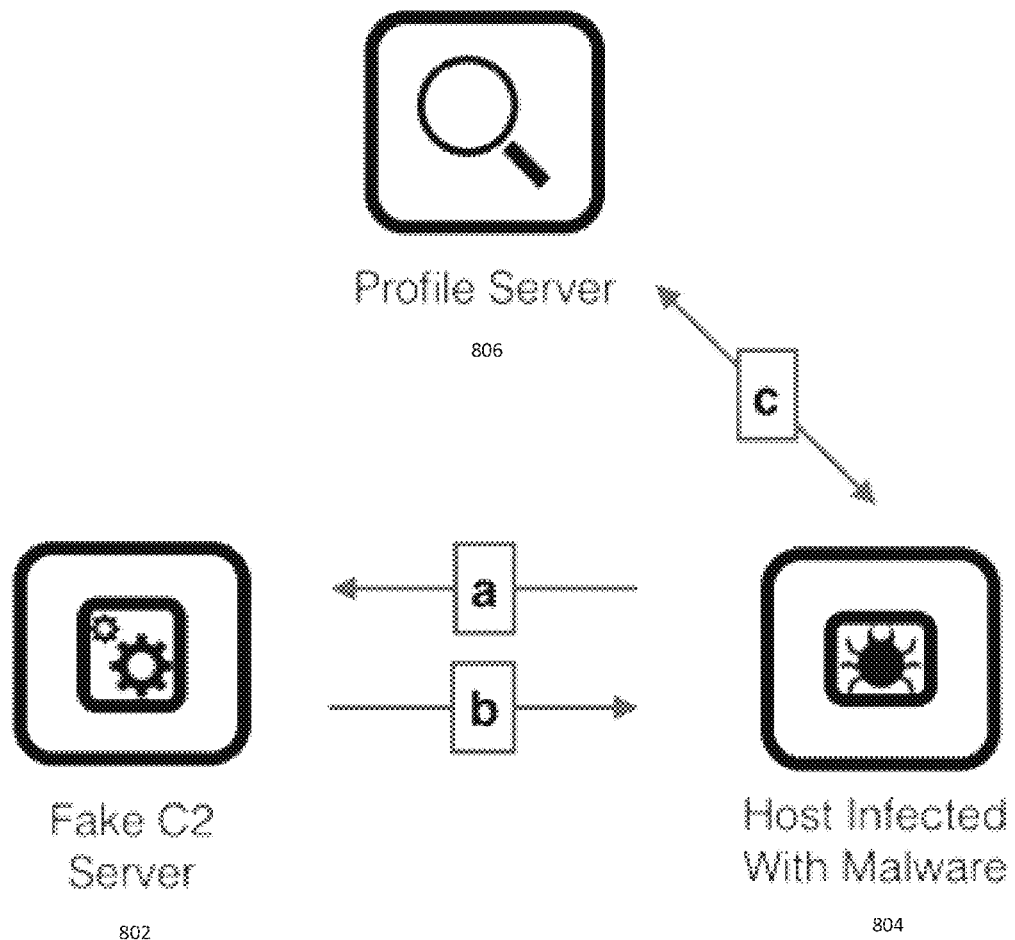
FIG. 8 is a schematic diagram of some of the technical components used for advertising fraud infrastructure infiltration, according to some embodiments.

FIG. 8 is an example schematic of some of the technical components for advertising fraud infrastructure infiltration, according to some embodiments. A fake command and control server 802 is provisioned, and various network redirection techniques are used to control a bot (e.g., an infected host) 804 to communicate with the fake command and control server 802. A profile is generated for the bot.

a. IP/DNS Spoofing Directing Bot Traffic To Fake C2

The bot may be executed on a host in a controlled environment and allowed to run freely. Depending on whether the bot may be using Domains or IP Addresses to contact its C2, the lab may be configured to either use IP or DNS spoofing to redirect the bot traffic to the Fake C2 Server.

b. Fake C2 Response

The Fake C2 Server will respond to the bot traffic using the identified (e.g., reverse engineered) C2 communication algorithms. When the bot requests advertising URLs, the Fake C2 Server may respond with a URL for the Profile Server 806.

c. Bot Directed To Communicate with Profile Server

Once the bot receives the URL for the Profile Server 806, it will connect to the Profile Server 806 and use its web browser component to simulate standard user behaviour. This behaviour may be captured by the Profile Server and used to develop a profile for the bot.

An example profile 1002 is shown in FIG. 10.

Example mechanisms to perform DNS and IP spoofing include configuring a lab only DNS server with A records for the domains one wishes to spoof pointing to IP address in the lab, using arp spoofing to redirect traffic to IP addresses in the lab, simply adding the desired domains and I Ps to the operating system "hosts" file, and so on.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments. Although each embodiment represents a single combination of inventive elements, other examples may include all possible combinations of the disclosed elements. Thus if one embodiment comprises elements A, B, and C, and a second embodiment involves elements B and D, other remaining combinations of A, B, C, or D, may also be used.

The term "connected" or "coupled to" may include both direct coupling (in which two elements that may be coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

For simplicity only one computing device for implementing system 200 is shown but system 200 may include more computing devices operable by users to access remote network resources and exchange data. The computing devices for implementing system 200 may be the same or different types of devices. The computing device for implementing system 200 at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

Figure 13:
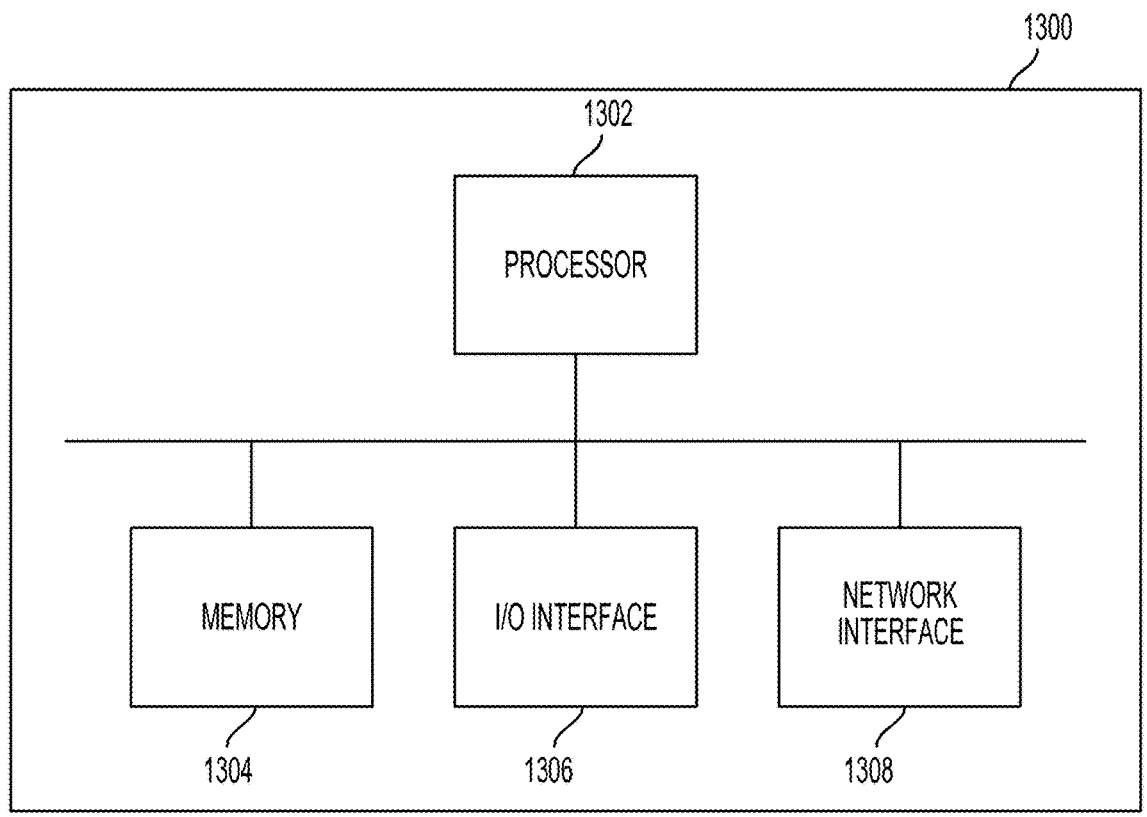
FIG. 13 is a schematic diagram of computing device for implementing the system according to some embodiments.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein FIG. 13 is a schematic diagram of computing device for implementing one or more computing components of system 1300, exemplary of an embodiment. As depicted, computing device for implementing system 1300 includes at least one processor 1302, memory 1304, at least one I/O interface 1306, and at least one network interface 1308.

Each processor 1302 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1304 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1306 enables computing device for implementing system 200 to interconnect with one or more input devices, such as a keyboard, mouse, camera, touch screen and a microphone, or with one or more output devices such as a display screen and a speaker.

Each network interface 1308 enables computing device for implementing system 1300 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

Computing device for implementing system 1300 is operable to register and authenticate users (using a login, unique identifier, and password for example) prior to providing access to applications, a local network, network resources, other networks and network security devices. Computing devices for implementing system 1300 may serve one user or multiple users.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only.

What is claimed is:

1. A method comprising:
   identifying a communication process used by a compromised computing device to communicate with a control server providing access to advertising weblinks;
   communicating, by a milker bot, a request for an advertising weblink to the control server, wherein the communicating includes using the communication process to mimic the compromised computing device;
   receiving the requested advertising weblink from the control server, wherein the advertising weblink includes metadata identifying the control server; and
   monitoring the control server based on the metadata.

2. The method of claim 1, wherein the monitoring of the control server includes at least one of determining an internet protocol address of the control server, identifying a MAC address of the control server, or identifying a physical location of the control server.

3. The method of claim 1, further including identifying an encryption process used by the compromised computing device, the bot implemented using the encryption process and the communication process.

4. The method of claim 1, wherein the identifying of the communication process includes:
   recording an instruction executed by the compromised computing device; and
   analyzing the recorded instruction to determine if the instruction is associated with the communication process.

5. The method of claim 1, wherein the identifying of the communication process includes:
   executing a binary code associated with the compromised computing device in a controlled computing environment; and
   analyzing information associated with the execution of the binary code to identify the communication process.

6. The method of claim 5, wherein the controlled computing environment is a virtual instance of an operating system including sensors, the sensors to collect the information associated with the execution of the binary code.

7. The method of claim 1, further including increasing a request rate of the milker bot by running a plurality of milker bots in parallel.

8. A non-transitory computer readable medium comprising instructions, which when executed, cause a processor to:
   identify a communication process used by a compromised computing device to communicate with a control server providing access to advertising weblinks;
   communicate, by a milker bot, a request for an advertising weblink to the control server, wherein the communicating includes using the communication process to mimic the compromised computing device;
   receive the requested advertising weblink from the control server, wherein the advertising weblink includes metadata identifying the control server; and
   monitor the control server based on the metadata.

9. The non-transitory computer readable medium of claim 8, wherein the monitoring of the control server includes at least one of determining an internet protocol address of the control server, identifying a MAC address of the control server, or identifying a physical location of the control server.

10. The non-transitory computer readable medium of claim 8, wherein the instructions, when executed, further cause the processer to identify an encryption process used by the compromised computing device, the milker bot implemented using the encryption process and the communication process.

11. The non-transitory computer readable medium of claim 8, wherein instructions cause the processor to identify the communication process by:
    record an instruction executed by the compromised computing device; and
    analyze the recorded instruction to determine if the instruction is associated with the communication process.

12. The non-transitory computer readable medium of claim 8, wherein instructions cause the processor to identify the communication process by:
    execute a binary code associated with the compromised computing device in a controlled computing environment; and
    analyze information associated with the execution of the binary code to identify the communication process.

13. The non-transitory computer readable medium of claim 12, wherein the controlled computing environment is a virtual instance of an operating system including sensors, the sensors to collect the information associated with the execution of the binary code.

14. The non-transitory computer readable medium of claim 8, wherein instructions cause the processor to identify the communication process by increasing a request rate of the milker bot by running a plurality of milker bots in parallel.

15. An apparatus comprising:
    memory;
    a processor to identify a communication process used by a compromised computing device to communicate with a control server providing access to advertising weblinks;
    a network interface to:
      communicate, by a milker bot, a request for an advertising weblink to the control server, wherein the communicating includes using the communication process to mimic the compromised computing device; and
      receive the requested advertising weblink from the control server, wherein the advertising weblink includes metadata identifying the control server; and
    the processor further to monitor the control server based on the metadata.

16. The apparatus of claim 15, wherein the processor monitors the control server by at least one of (1) determining an internet protocol address of the control server, (2) identifying a MAC address of the control server, or (3) identifying a physical location of the control server.

17. The apparatus of claim 15, wherein the processer is further to identify an encryption process used by the compromised computing device, the milker bot implemented using the encryption process and the communication process.

18. The apparatus of claim 15, wherein the processor is further to:
   record an instruction executed by the compromised computing device; and
   analyze the recorded instruction to determine if the instruction is associated with the communication process.

19. The apparatus of claim 15, wherein the processor is further to:
   execute a binary code associated with the compromised computing device in a controlled computing environment; and
   analyze information associated with the execution of the binary code to identify the communication process.

20. The apparatus of claim 19, wherein the controlled computing environment is a virtual instance of an operating system including sensors, the sensors to collect the information associated with the execution of the binary code.

* * * * *